United States Patent [19]
Pierotti et al.

[11] Patent Number: 5,984,351
[45] Date of Patent: Nov. 16, 1999

[54] DUAL STAGE ACTUATION SYSTEM

[75] Inventors: L. John Pierotti, Huntsville; Kelly B. Johnson, Layton, both of Utah; Brett Hussey, Murr, Germany; Karl K. Rink, Liberty; Bradley W. Smith, Ogden, both of Utah

[73] Assignee: Autoliv ASP, Inc., Ogden, Utah

[21] Appl. No.: 08/843,324

[22] Filed: Apr. 11, 1997

[51] Int. Cl.⁶ ................................................. B60R 21/26
[52] U.S. Cl. .................... 280/736; 102/531; 102/741; 102/742
[58] Field of Search .................... 280/741, 742, 280/736, 737; 102/530, 531

[56] References Cited

U.S. PATENT DOCUMENTS

| | | | |
|---|---|---|---|
| 3,910,595 | 10/1975 | Katter et al. | 280/150 AB |
| 3,948,540 | 4/1976 | Meacham | 280/150 AB |
| 3,966,228 | 6/1976 | Neuman | 280/737 |
| 4,380,346 | 4/1983 | Davis et al. | 280/736 |
| 4,950,458 | 8/1990 | Cunningham | 422/164 |
| 5,078,422 | 1/1992 | Hamilton et al. | 280/736 |

FOREIGN PATENT DOCUMENTS 5311433  2/1978  Japan.

*Primary Examiner*—Eric Culbreth

[57] ABSTRACT

The invention is directed to an actuation system that is contained within a divided pressure vessel which has two chambers under pressure, separated by a common partition and piston. The system is operated by causing an opening in the first chamber, creating a pressure differential between the two chambers which causes the piston to move and fluid to flow between the two chambers. Movement of the piston may or may not expose flow orifices between the two chambers. Pyrotechnic material is enclosed within the piston to generate combustion products for augmenting performance. The two chambers can be used to contain inert working gases or reacting fluids that are isolated from one another until the system is actuated.

18 Claims, 22 Drawing Sheets

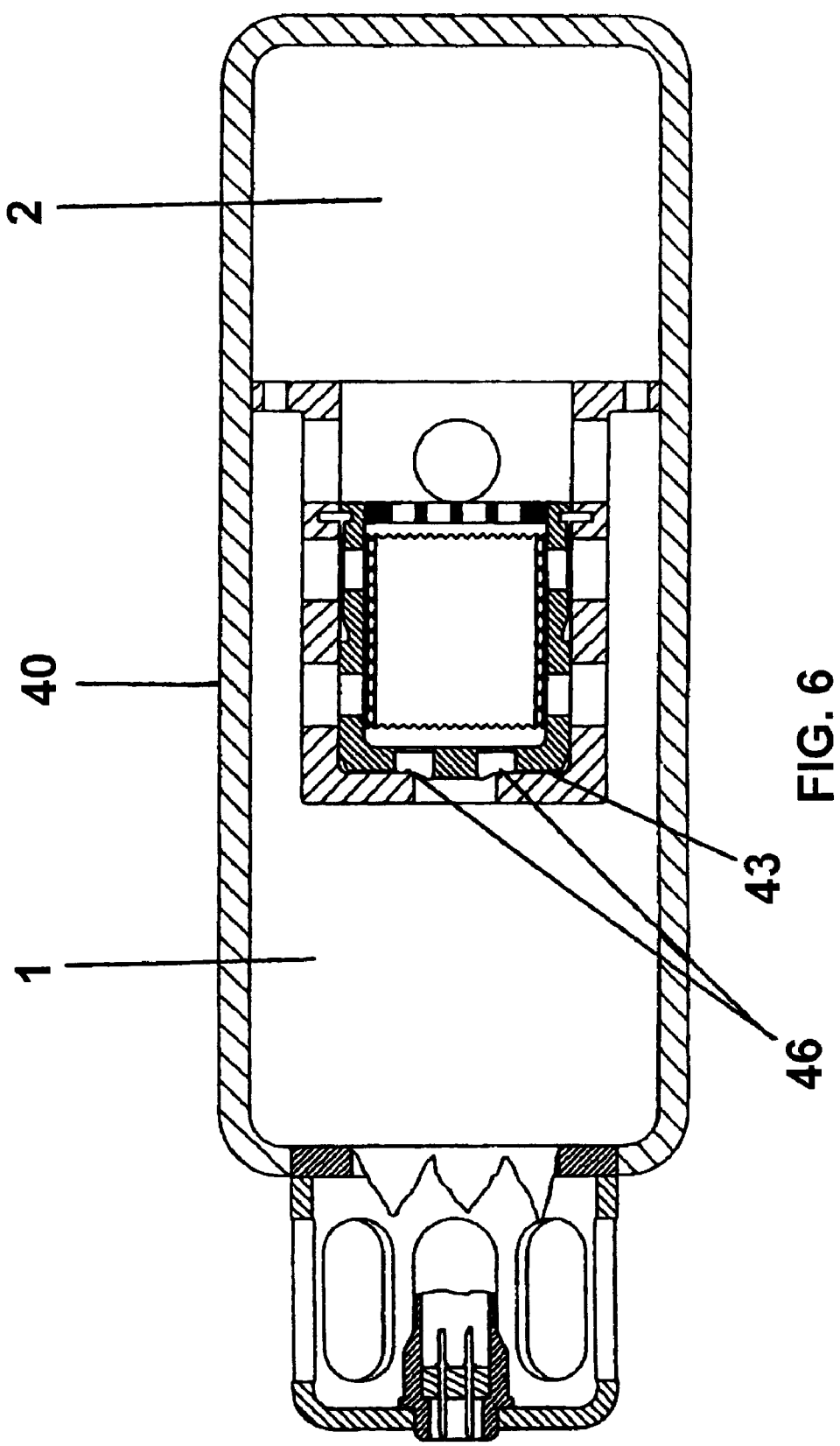

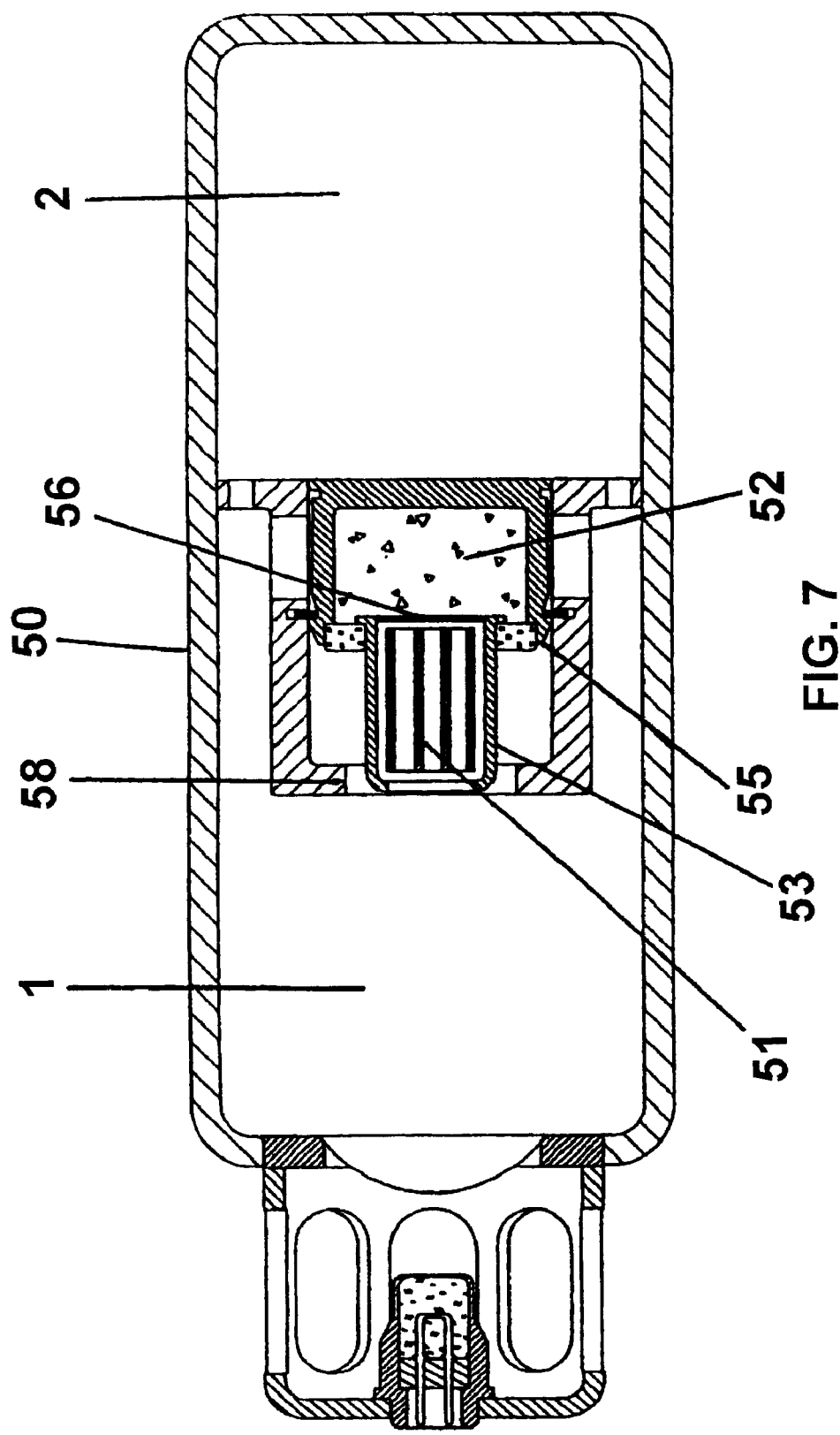

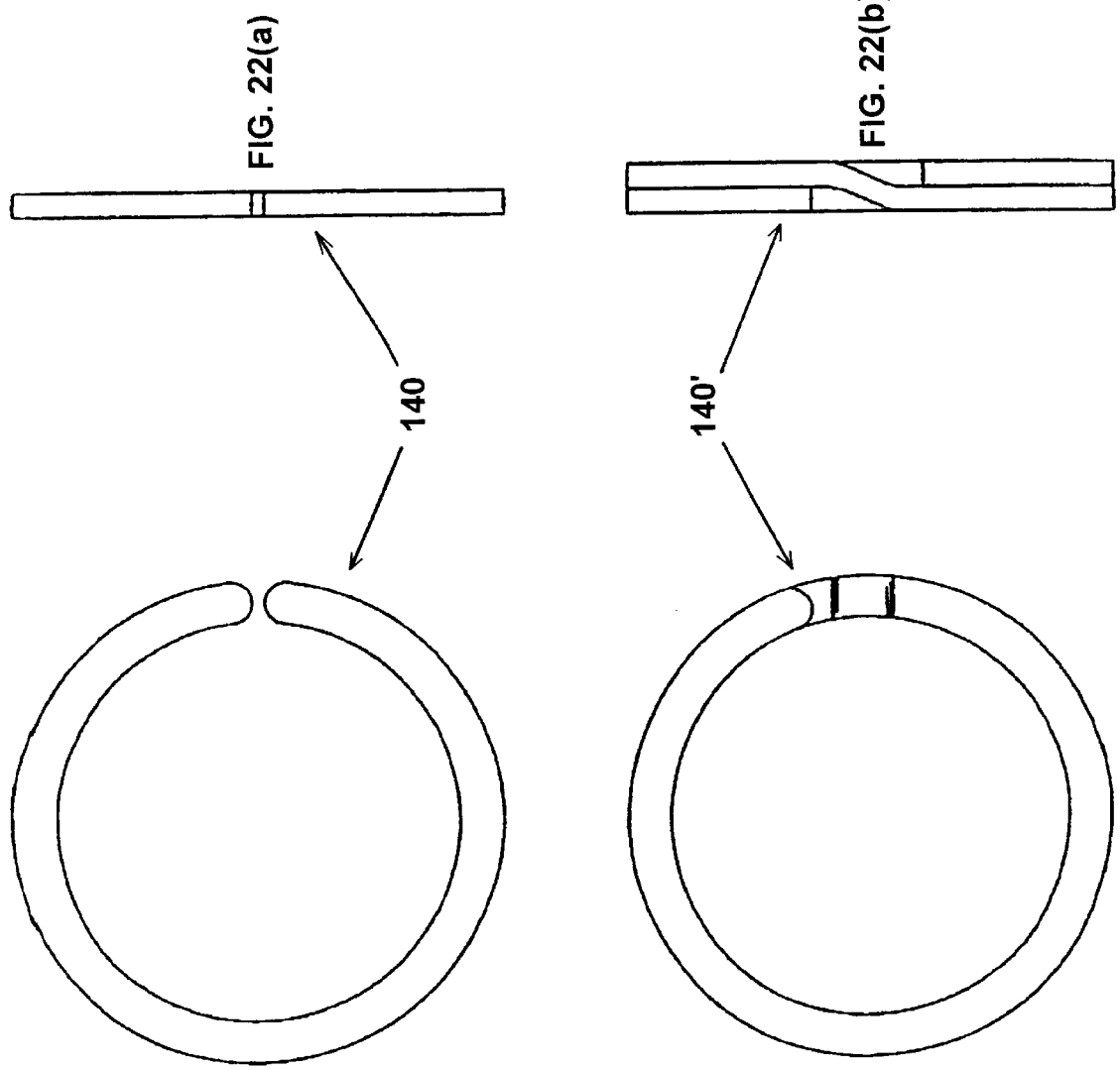

DUAL STAGE ACTUATION SYSTEM

BACKGROUND OF THE INVENTION

1. Field of the Invention

The present invention relates to self-actuating systems containing pressurized fluids, such as gas augmented air bag inflators and other stored gas products. Specifically, the invention relates to a dual-stage internal actuation system that relies on a rapid pressure differential.

2. Related Art

Many disclosures have been made in the prior art for the regulation of the flow rate of a pressurized fluid into an inflatable structure such as those employed in inflatable restraint systems used in the automotive industry for inhibiting the forward motion of a passenger during an accident or collision. A category of inflator that has recently been developed for inflating an inflatable structure, such as an air bag, is one that provides an inflation flow rate of pressurized fluid to partially inflate the structure, followed by a delayed or second increased flow rate of pressurized fluid to complete inflation of the structure. These types of inflators can be further categorized in that the second increased flow rate of fluid is accomplished by the use of differential pressures. A summary and description of the prior art employing a differential pressure to accomplish the delayed inflation of an inflatable structure is provided in U.S. Pat. No. 5,078,422 issued to Hamilton et al. on Jan. 7, 1992, and is itemized as follows:

U.S. Pat. No. 3,966,228 issued to Neuman on Jun. 29, 1976;

U.S. Pat. No. 3,948,540 issued to Meacham on Apr. 6, 1976;

U.S. Pat. No. 4,380,346 issued to Davis et al. on Apr. 19, 1983;

U.S. Pat. No. 4,950,458 issued to Cunningham on Aug. 21, 1990;

Japanese Patent 53-11433 (based on Japanese Patent Application 51-34232).

The Hamilton et al. patent (U.S. Pat. No. 5,078,422) discloses an inflator having a chamber containing a pressurized fluid for inflating an air bag. A separate differential pressure housing is provided within the chamber to actuate a percussion primer communicating with a propellant in a gas generator housing for augmenting the pressurized fluid in the chamber. In one embodiment, the differential pressure housing is divided into two compartments by a bistable pressure sensing device e.g. a cup-shaped diaphragm, which monitors the differential pressure between a pressure related to the first housing pressure and a reference pressure. Both compartments are in fluid communication with the outer housing through ports or orifices.

Efforts have also been made to incorporate devices into inflators for accommodating the use of a differential pressure for delayed flow rates of pressurized fluids to inflate confinements such as air bags. Representative of these devices include U.S. Pat. Nos. 3,910,595 and 5,078,422.

SUMMARY OF THE INVENTION

An object of the present invention is to provide a self-actuating system with flexibility in tuning capability. By tuning capability is meant the ability to adapt the design to meet the specific performance requirements for a given application. The timing and amount of inflation fluids delivered by the inflator are examples of performance requirements. A further object is to provide a more benign flow environment in a co-flow environment which makes it easier to control and contain an exothermic reaction. A specific object of the present invention is to provide stepped or dual-stage performance in a mechanically simple inflator device with few parts, high reliability and which is self-actuating once the burst disc has been ruptured. Another object of the invention is to provide a dual-stage actuation inflator which allows for a gentle onset of pressure, e.g. the attainment of a generally S-shaped pressure curve.

Briefly, these and other objectives of the present invention are the result of the described novel apparatus (actuation system) for dispensing an inflation (pressurized) fluid contained within a divided pressure vessel. Inflation fluids useful in the present invention include liquids, gases, suspended solids, or multi-phase combinations of these. The pressure vessel is constructed of first and second chambers, which may be or may not be at equal pressure, separated by a dividing partition or bulkhead. The partition extends into the interior of the pressure vessel and includes a cylinder with internal and external walls and a hollow piston or valve, which is slidably engaged with said cylinder. Said cylinder extends axially within the pressure vessel and terminates with an end portion which protrudes into one of said first and second chambers. Said terminal end portion may or may not be in open communication with the chamber into which it protrudes. Also in accordance with the invention, the first and second chambers may or may not be in open fluid communication. In the case of fluid fueled inflators, as will be discussed later, it is desirable for the first and second chambers to be hermetically separated.

The system is made functional by pressurizing both chambers with a fluid. If it is desired to equalize the pressure between the first and second chambers, equilibration orifices can be provided in the partition wall. Alternatively, different types of pressurized fluids can be stored in the first and second chambers by hermetically sealing the bulkhead. Activation is accomplished by removing or rupturing the closure means (burst disc) at the end of the vessel, either automatically in response to a stimulus external of the actuation system, or manually. The external stimulus used to open the burst disc may be temperature. At a sufficiently high temperature the pressure will be high enough to rupture the burst disc without any other means. This is significant for air bag inflators because under autoignition (e.g. a burning car) the inflator will self actuate. Some current stored gas designs will vent under similar conditions but the pyrotechnic materials will not always burn leaving a potential hazard. Once the closure means is removed, a pressure differential is created between the first and second chambers by the rapidly escaping fluid in the first chamber which causes the retention means of the piston to give way and release the piston axially forward into the cylinder. The piston's forward movement into the cylinder exposes the cylinder orifices to the second chamber which causes the pressurized fluid in the second chamber to exit through the cylinder orifices into the first chamber, and then into the ambient surroundings of the pressure vessel by way of the vessel opening.

The pressure of the fluid in the first and second chambers can also be augmented by the provision of a substance within the piston (a pyrotechnic or inflammable mixture) such that when contact is made between the axial end of the cylinder and primers provided at the forward end of the piston, sufficient heat is generated to cause the substance to emit a heated and pressurized fluid, i.e. augmenting fluid, that will further increase the pressure of the fluid in the first and second chambers. In this latter situation, flow orifices can be provided in the partition in lieu of the radial cylinder orifices. Flow of the augmenting fluid into the first chamber would then be accomplished by the provision of an axial opening in the forward end of the cylinder.

The hollow piston is formed in the shape of a cylinder and includes an enclosed space which houses a conventional pyrotechnic charge material. The pyrotechnic may be in any conventional form, i.e. solid or fluid. Solid pyrotechnics include such forms as powdered, granular, pellet, wafer, etc. and fluid forms include gaseous, liquid, finely suspended solids, or multi-phase combinations thereof. The hollow piston also includes means for igniting the pyrotechnic, which ignition means is in contact with the pyrotechnic. Movement of the piston relative to the cylinder causes the ignition means to be struck initiating an ignition sequence within the enclosed pyrotechnic. The ignition means can take the form of any conventional and well known igniter including but not limited to percussion primers, pyrotechnic boosters, etc.

The system has particular application in air bag inflators in which an initiator is used to rupture a seal across the opening of the pressure vessel. This creates a pressure differential between the two chambers. The pressure differential causes the piston to move, which may or may not expose flow orifices between the two chambers. Fluid is caused to flow from the second chamber to the first. Ignition means such as percussion primers located on the piston are struck as a consequence of the piston's motion, initiating an ignition sequence within the enclosed pyrotechnic or inflammable material. Burning of the pyrotechnic generates combustion products that can be directed into either chamber to thermally augment venting performance by generating heat to raise the pressure of the gas stored in the vessel. The combustible material also generates additional gas to augment the gas stored in the vessel. The stored gas and the gas generated by the combustible materials are directed into the air bag to cause it to inflate.

Also a heat producing but not necessarily gas-producing material, such as a material which provides an exothermic chemical reaction, can be positioned in the pressure vessel such that a portion of the gas flowing from the second chamber into the first chamber moves across the exothermic material. The exothermic reaction is initiated by a small amount of pyrotechnic booster powder or some other heat source. The gas flowing across the exothermic material is heated thus causing heat to be transferred to the venting gas. The increased heat of the gas raises its pressure thereby further augmenting the flow of the venting gas into the air bag cushion. The exothermic material can comprise an aluminothermic material, that is, one which utilizes a powder metal oxide, aluminum reductant and a binder. Exemplary of such material is Thermite®.

Though the actuation system of the invention is primarily designed for use with air bag inflators, it may also be used in other applications where time-delayed metering of pressurized fluids is relevant. The present invention could also be used to control the reaction of hypergolic fluids or components that react endothermically, which could be useful in quenching systems.

The advantage for the dual-stage actuation system of the present invention is that it permits a time-delayed metering of one or more pressurized fluids exiting the vessel and provides great flexibility in tuning capability. This may be accomplished by varying (1) chamber volumes, (2) orifice sizes, (3) pyrotechnic load and type, (4) fluid load and type, (5) piston orientation; and (6) actuation pressure differential.

BRIEF DESCRIPTION OF THE DRAWINGS

With the description of the invention, a detailed description follows with reference being made to the accompanying figures of drawing, which form part of the specification, in which some like parts are designated by the same reference numbers, and of which:

FIG. 6 is a cross-sectional view of the embodiment of FIG. 5 in the post-actuation state;

FIG. 7 is a cross-sectional view illustrating a further embodiment of the actuation device of the present invention in the pre-actuation state including a combination of pyrotechnic materials;

FIG. 22(a) illustrates a single ring construction;

FIG. 22(b) illustrates a double wound ring construction; and

DESCRIPTION OF PREFERRED EMBODIMENT

The present invention relates to dual-stage self-actuating systems contained within a divided pressure vessel and particularly to dual-stage gas augmented air bag inflators employed in vehicle inflatable restraint systems. The present invention is applicable to various inflator constructions that are connected to an air bag but are temporarily isolated therefrom by a sealing means. The sealing means can take various forms such as a valve or frangible burst disc. In particular, the seal can be in the form of a thin rupturable disc preferably made of stainless steel or nickel based alloy.

Figure 1:
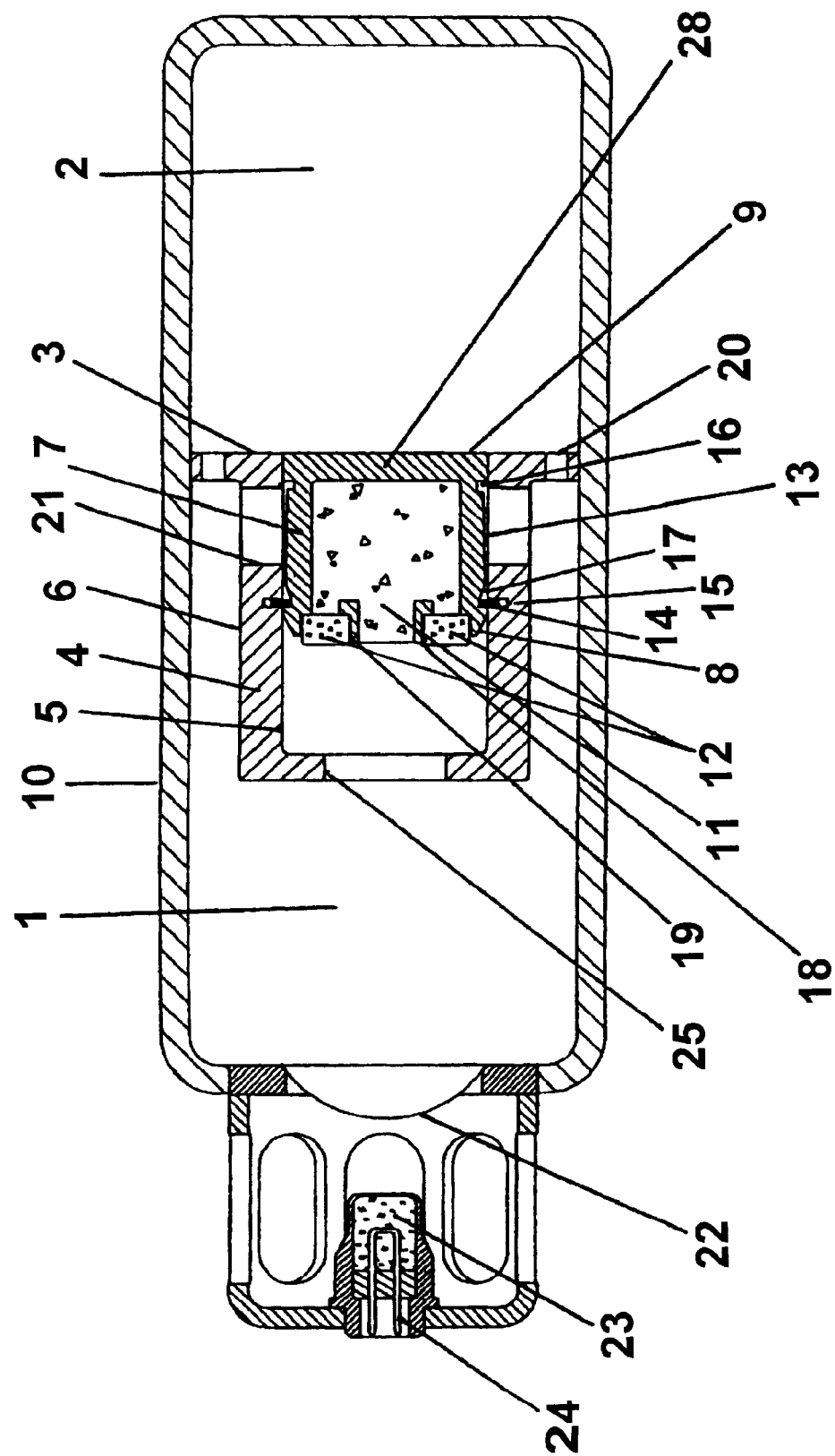
FIG. 1 is a cross-sectional view of the internal structure of an actuation device in the pre-actuation state with a radial bulkhead orifice of the present invention.
Figure 2:
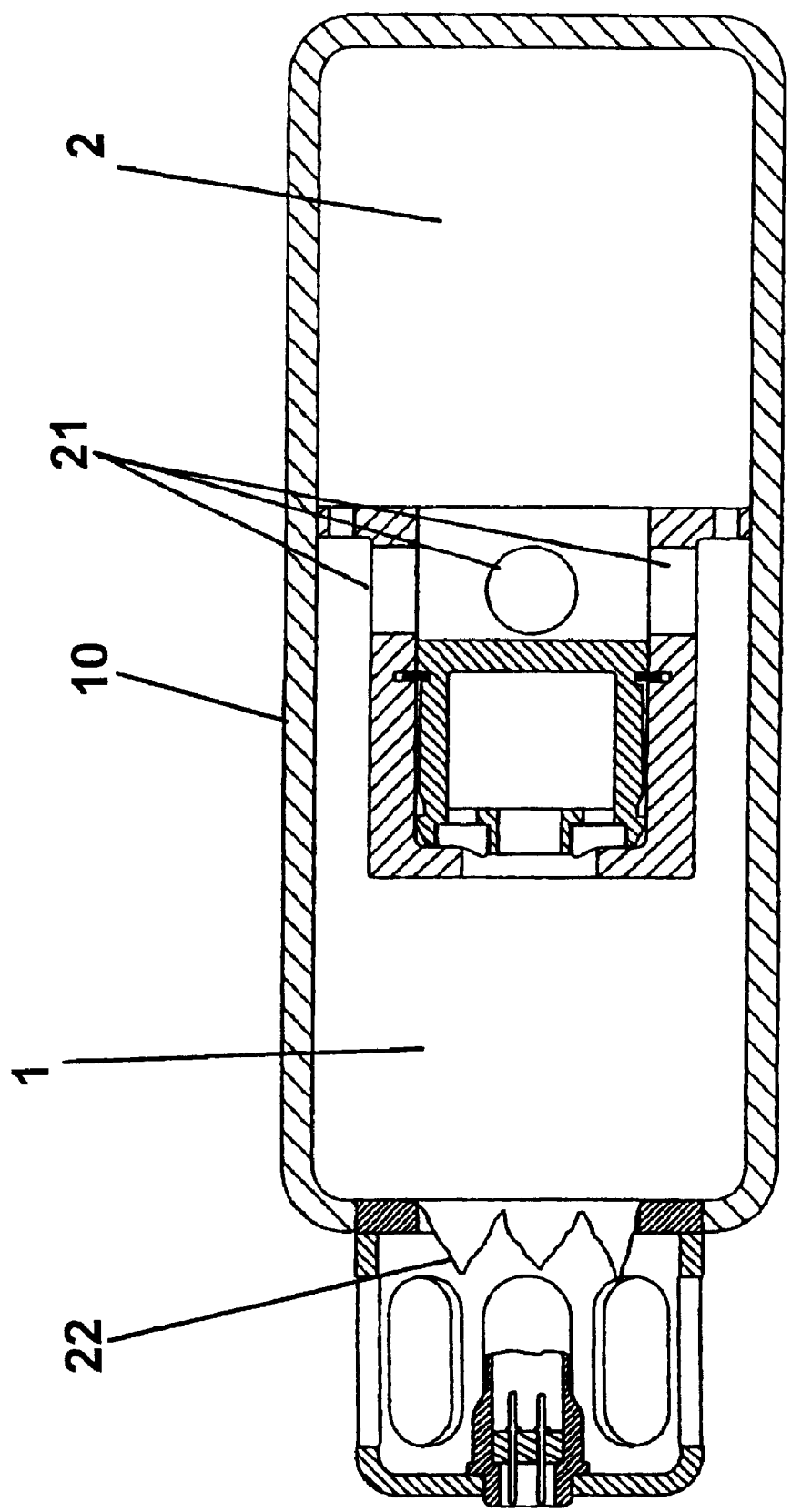
FIG. 2 is a cross-sectional view of the embodiment of FIG. 1 in a post-actuation state.

FIGS. 1 and 2 illustrate a dual-stage hybrid inflator 10 having two chambers 1 and 2 which are under equal pressure. The volumes of chambers 1 and 2 are such that each contributes a significant portion of the inflation gases. Said chambers 1 and 2 are separated by a partition 3. Partition 3 includes a cylinder 4 with internal 5 and external walls 6. A cup-shaped hollow piston 7 having first (leading) 8 and second terminal ends 9 is slidably received in cylinder 4. The second end of piston 7 terminates in end wall 10. Piston 7 can comprise a one piece construction or a welded construction. A pyrotechnic 11 is constructed so as to include ignition means 12 for igniting pyrotechnic charge 11. Such ignition means 12 can comprise any conventionally used igniters such as percussion primers, pyrotechnic boosters or other suitable ignition devices. Percussion primers used in the invention can be obtained from Olin, Winchester-Western Division under the specification No. M42C1-PA101 (979). These primers comprise a basic lead styphnate tetracene type non-corrosion mixture contained in a copper alloy cup including a white kraft paper coated with nitrocellulose primer foil. The external surface of piston 7 is shaped to provide a slotted region 13, which is slidingly engaged with snap ring 14 provided in recess 15 in the internal wall 5 of cylinder 4. Slotted region 13 is provided with notched recesses 16 and 17 for seating snap ring 14 when piston 7 is in both the unfired (FIG. 1) and fired positions (FIG. 2). Notches 16 and 17 fix the tracking of piston 7 within cylinder 4. Snap ring 14 and associated notched recesses 16 and 17 provide retention means for maintaining positioning of piston 7 relative to cylinder 4. The leading end of piston 7 is constructed with holes or recesses 18 to hold ignition means 12 and is provided with a central opening 19 for discharging the combustion products into chamber 1. Terminal end 9 of piston 7 forms a wall 10 which fits flush with the partition 3 when the inflator is in the unfired condition.

Partition 3 has axial orifices 20 for maintaining fluid communication between chambers 1 and 2. Axial orifices 20 are sized so that they maintain fluid communication under static conditions only. Once chamber 1 begins to vent, the fluid communication between the two chambers is negligible thus allowing a pressure differential to develop between the two chambers. Cylinder 4 has radial orifices 21 which are closed when the inflator is in the unfired position as seen in FIG. 1 but are opened upon firing of the inflator as seen in FIG. 2. It is to be understood that there is no specific need for wall 10 to be flush with partition 3 as shown in FIG. 1, as long as radial orifices 21 are covered.

In order for the air bag inflator 10 to operate, disc 22 must be ruptured to initiate inflation of the air bag. In that regard initiator 23 is positioned adjacent to and in close proximity with disc 22, preferably on the manifold 26 side. In the event the vehicle is involved in a collision or impact, sensors (not shown) send a signal to initiator 23 through leads 24. Receipt of said signal activates the initiator 23 which causes a rupture of disc 22 and results in a pressure drop in chamber 1. Venting of the pressurized fluid from chamber 1 causes a pressure differential to exist between chambers 1 and 2, resulting in movement of piston 7 in cylinder 4 to the position shown in FIG. 2. This movement permits gas to flow from chamber 2 to chamber 1 through radial orifices 21 in cylinder 4. Primer 12 is struck as a result of the piston's movement, initiating ignition of pyrotechnic 11. The ensuing burning of pyrotechnic 11 generates gaseous combustion products that are directed into chamber 1 through opening 25 in the cylinder 4 and which mix with the venting gas thermally augmenting inflator performance.

Figure 3:
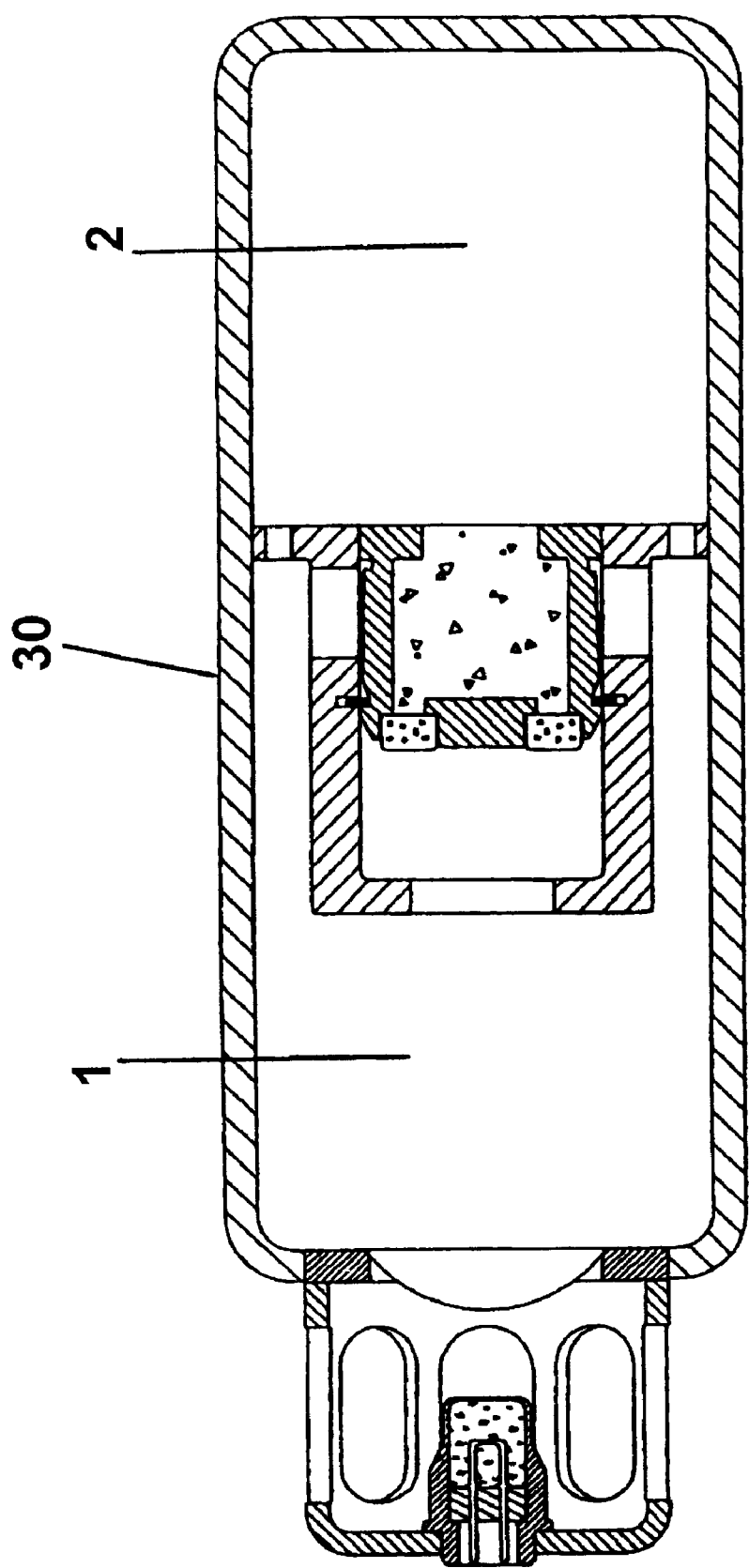
FIG. 3 is a cross-sectional view illustrating an embodiment of the actuation device of the present invention in the pre-actuation state wherein the augmented combustion gas exits into chamber 2.
Figure 4:
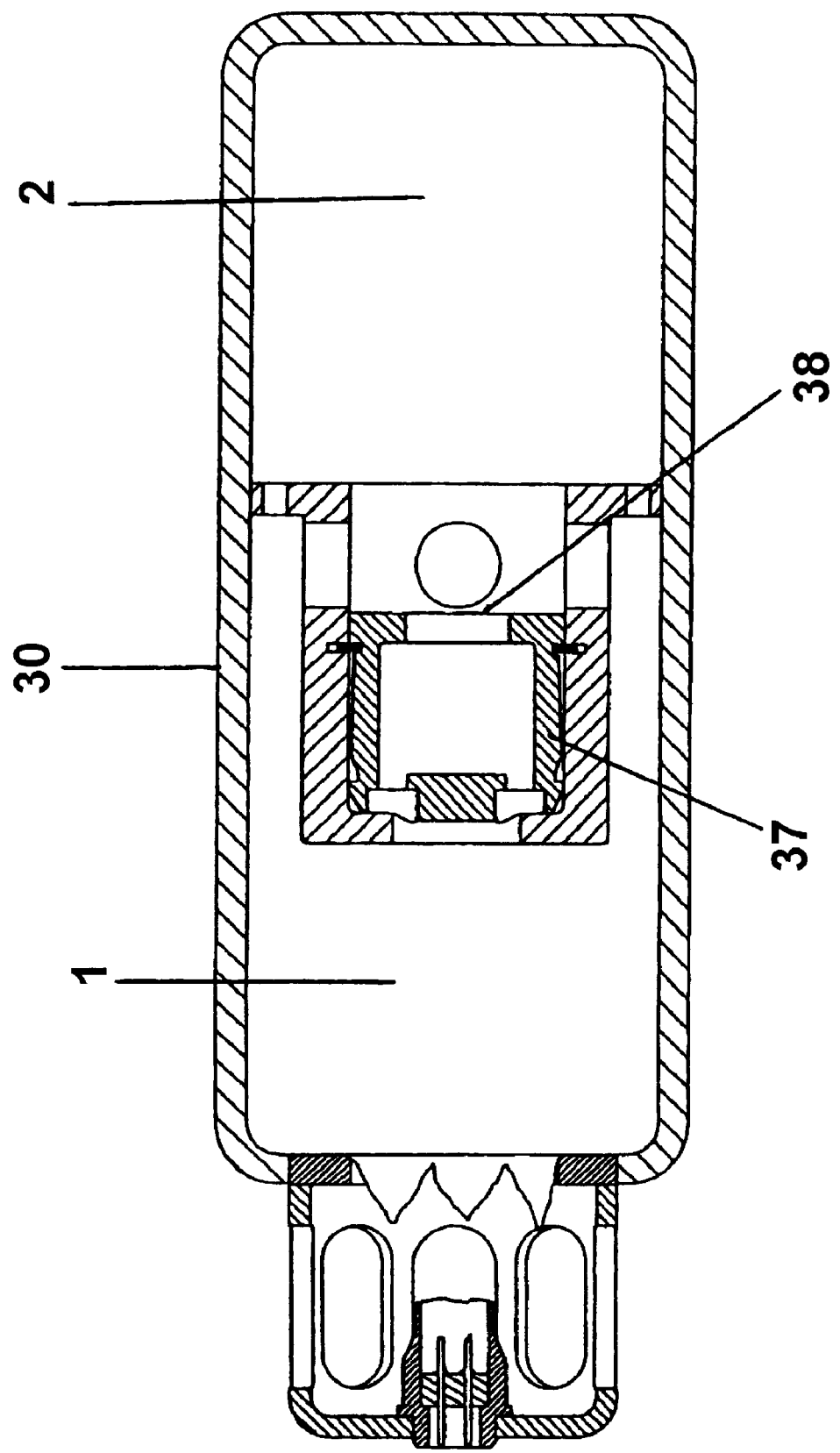
FIG. 4 is a cross-sectional view of the embodiment of FIG. 3 in the post-actuation state.

FIGS. 3 and 4 illustrate a different embodiment of the invention wherein the gaseous combustion products are directed into chamber 2. In order to accomplish this embodiment, it is necessary to provide opening 38 in wall 36 of piston 37. Except for the manner of discharging the thermally augmenting gaseous products into chamber 2, the inflator operates in the same manner as that of the embodiment of FIGS. 1 and 2.

FIGS. 1–4 illustrate two air bag inflator concepts where cold gas is augmented by a powdered or granular pyrotechnic such as UIX which is composed of $BKNO_3$ and consists of about 25% B and 75% $KNO_3$ by weight. Those skilled in the art will recognize that any suitable conventionally used pyrotechnic material will suffice for producing the augmenting gas source.

Figure 5:
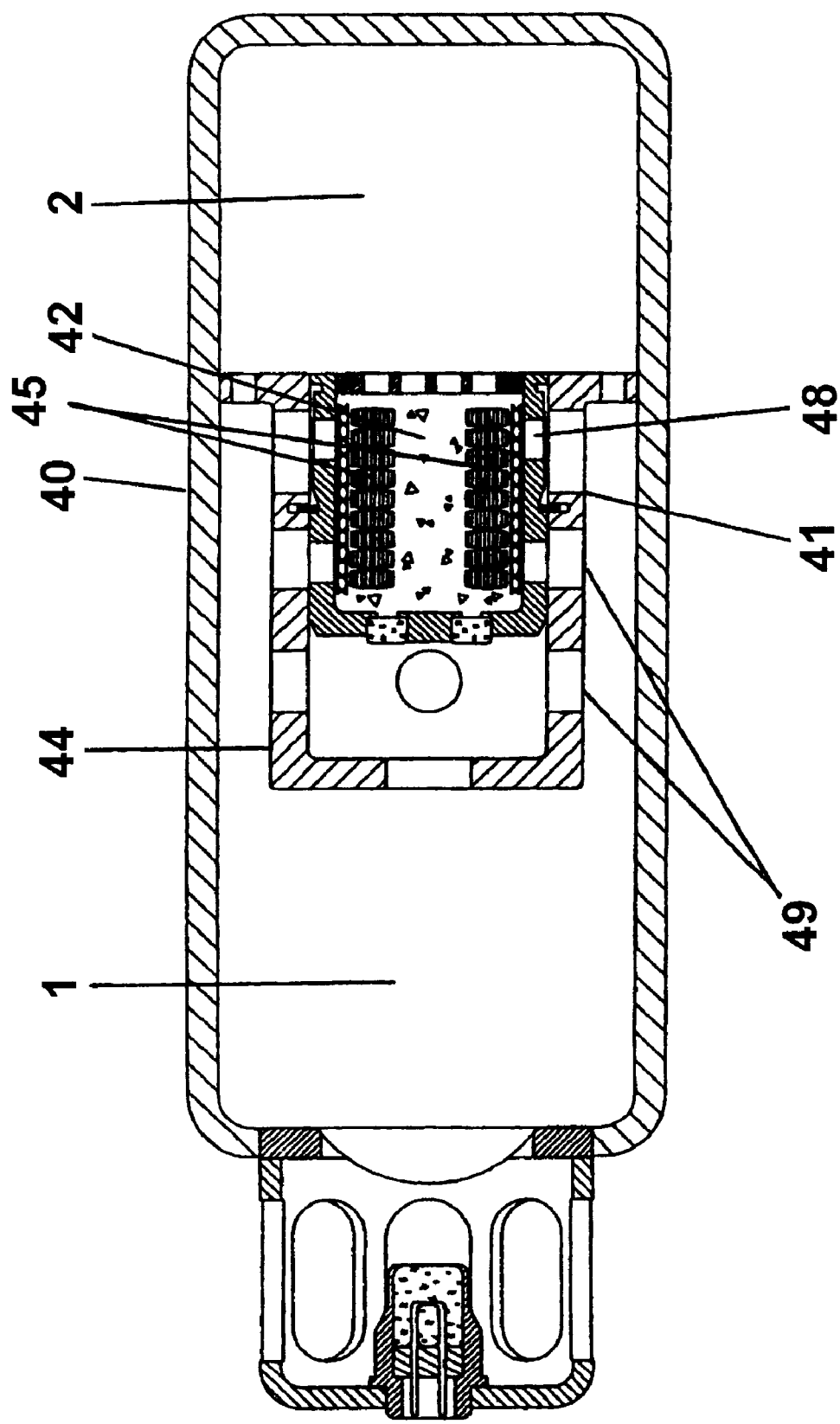
FIG. 5 is a cross-sectional view illustrating an embodiment of the actuation device of the present invention in the pre-actuation state wherein the gas-heating charge is an aluminothermic material.

FIGS. 5 and 6 illustrate another embodiment of the invention comprising inflator 40 where an exothermic material 45, e.g. Thermite®, is used in combination with granular material 42 for making up the pyrotechnic charge. Also the hollow piston 47 and cylinder 44 are provided with aligned orifices 48 and 49, respectively, which provides flexibility in the inflator's tuning capability. Further, the combustion products resulting from ignition of the pyrotechnic are exhausted both into chamber 1 through aligned orifices 48 and 49 in the piston and cylinder walls. A portion of the gas flowing from chamber 2 flows through orifices 41, while a smaller amount flows across the exothermic material 45 where it is heated before flowing out orifices 48 and 49 into chamber 1. Orifices 49 can be sized relative to orifice 41 such that the flow environment is benign enough to control and contain the exothermic material 45.

Figure 7A:
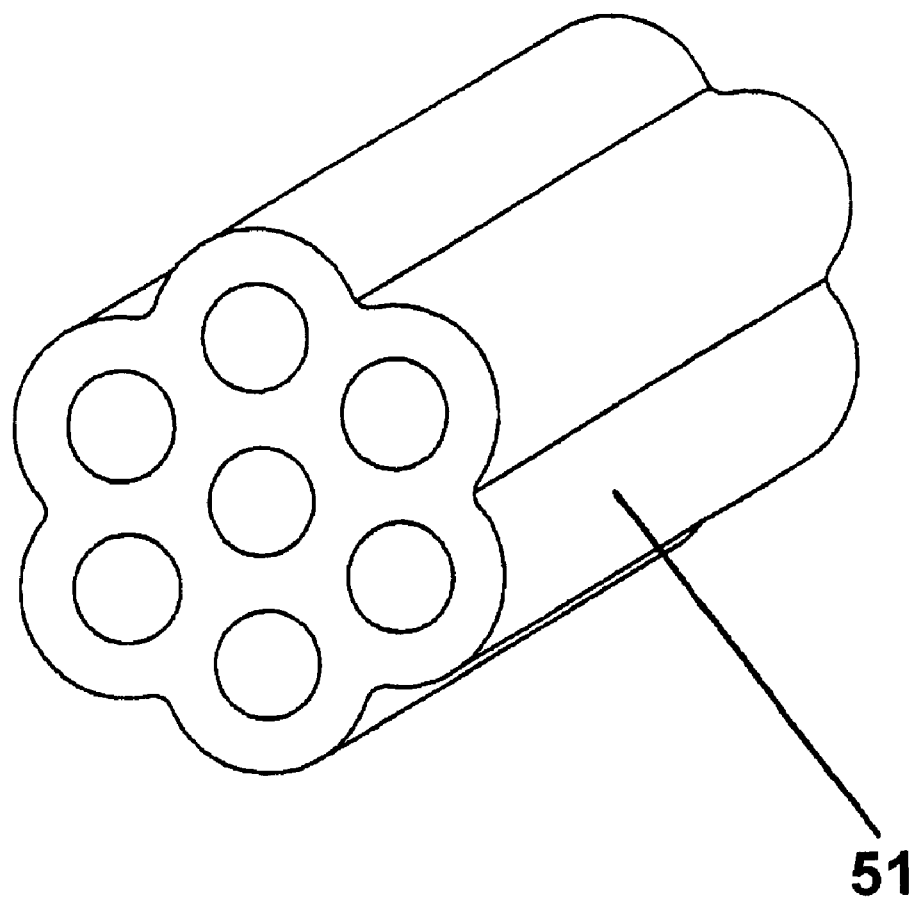
FIG. 7(a) is a cross-section of the extruded solid pyrotechnic of FIGS. 7 and 9.
Figure 8:
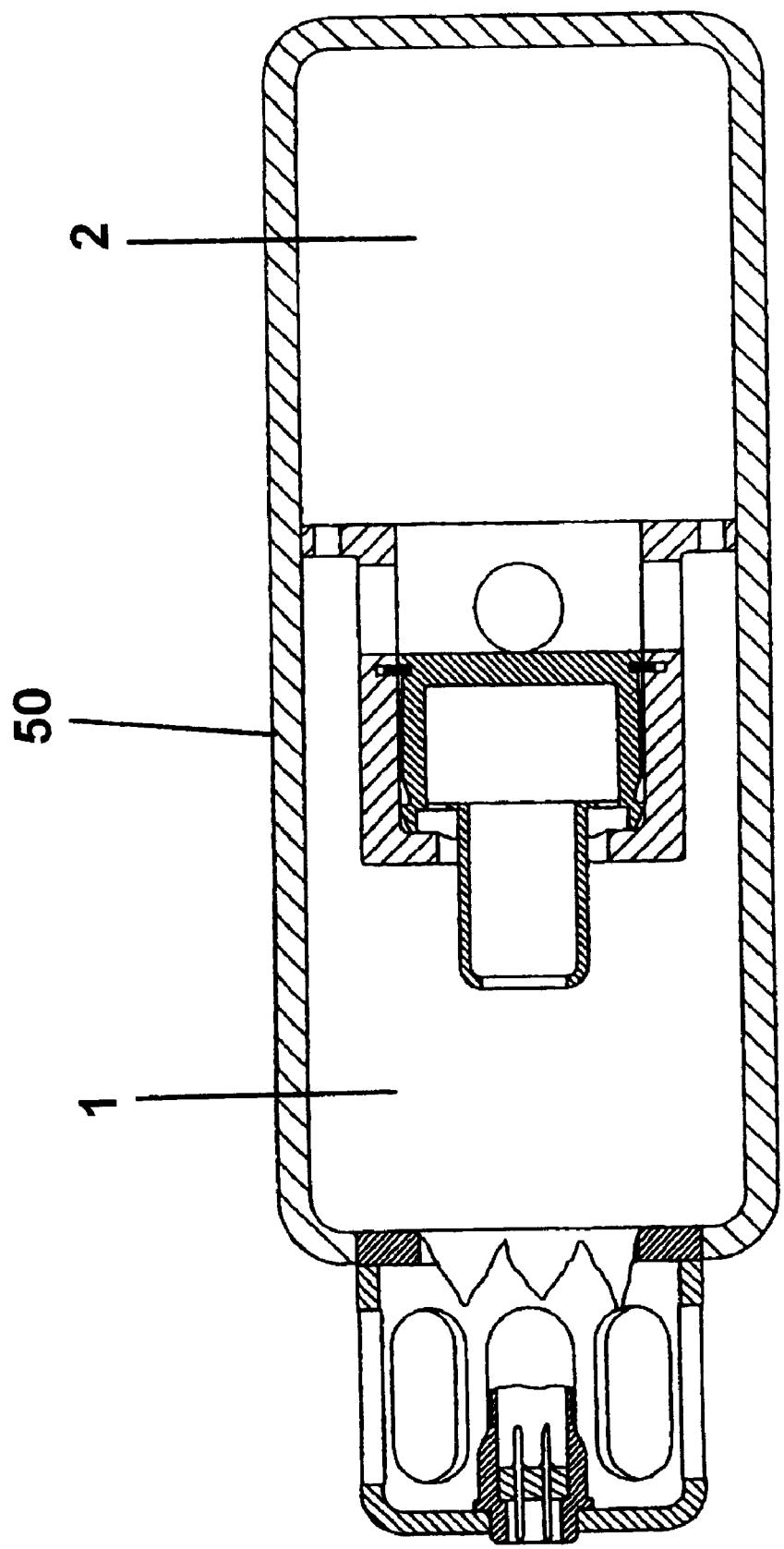
FIG. 8 is a cross-sectional view of the actuation device of FIG. 7 in the post-actuation state.
Figure 9:
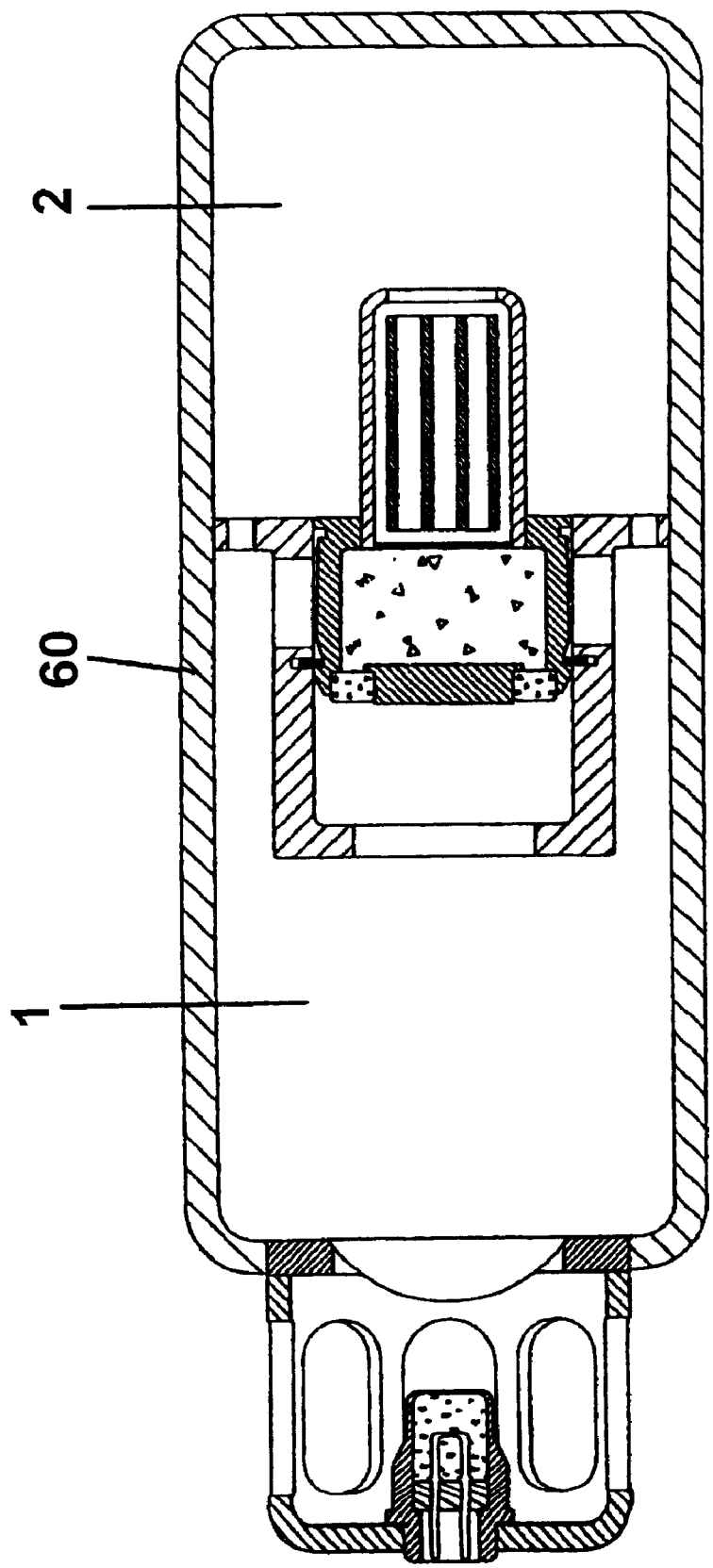
FIG. 9 is a cross-sectional view of a modified actuation device of FIG. 7 in the pre-actuation state wherein the augmenting combustion gas is exhausted into chamber 2.
Figure 10:
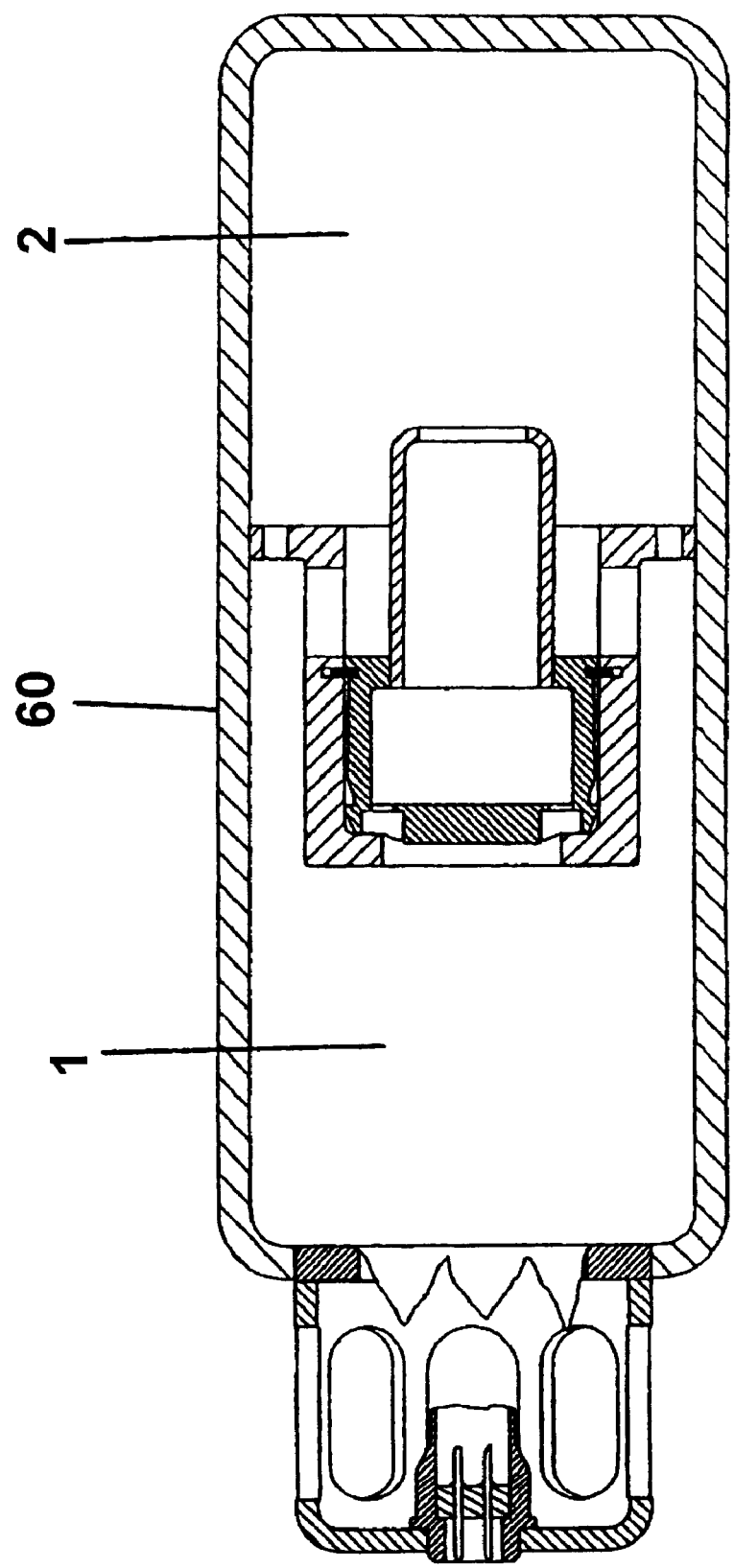
FIG. 10 is a cross-sectional view of the device of FIG. 9 in a post-actuation state.

FIGS. 7, 8, 9, and 10 illustrate further embodiments wherein a combination of pyrotechnic materials are used. Inflator 50 of FIGS. 7 and 9 employs additional solid pyrotechnic 51 with granular material 52. The solid pyrotechnic material illustrated in FIGS. 7 and 9 is an extruded shape with a honeycomb cross section, as shown in FIG. 7(a). This is typically used in hybrid (stored gas) inflators. Any conventional material can be used in making such shapes, but commonly it is a PVC-based composition. U.S. Pat. Nos. 3,723,205 (Scheffer) and 4,981,534 (Scheffer) teach the use of PVC plastisol [poly (vinyl chloride) plus a plasticizer] as a fuel and binder for the pyrotechnic material which are incorporated herein. Extruded gas generant shapes are described in U.S. Pat. No. 5,486,248. As can readily be seen in FIG. 7, the solid pyrotechnic 51 is enclosed in container 53, which is affixed to the leading end 55 of piston 57. A frangible or burstable diaphragm or seal 56, e.g. a foil barrier is provided to isolate the two pyrotechnic materials. As illustrated, container 53 is sized so that it can traverse opening 58 in cylinder 54 and is constructed to be in open communication with chamber 1. Inflator 60 of FIGS. 9 and 10 differs from inflator 50 of FIGS. 7 and 8 in providing for exhausting of the gaseous combustion products into chamber 2 rather than chamber 1. The parts of the inflators are otherwise the same.

The granular material is used to ignite the solid pyrotechnic material and does not appreciably augment the gas. The amount of granular pyrotechnic needed is less than that required for the embodiments of FIGS. 1–4. The advantages of using the solid pyrotechnic is that it burns at a slower rate than does an equivalent amount of UIX, allowing more useful tuning of the inflator performance.

Figure 11:
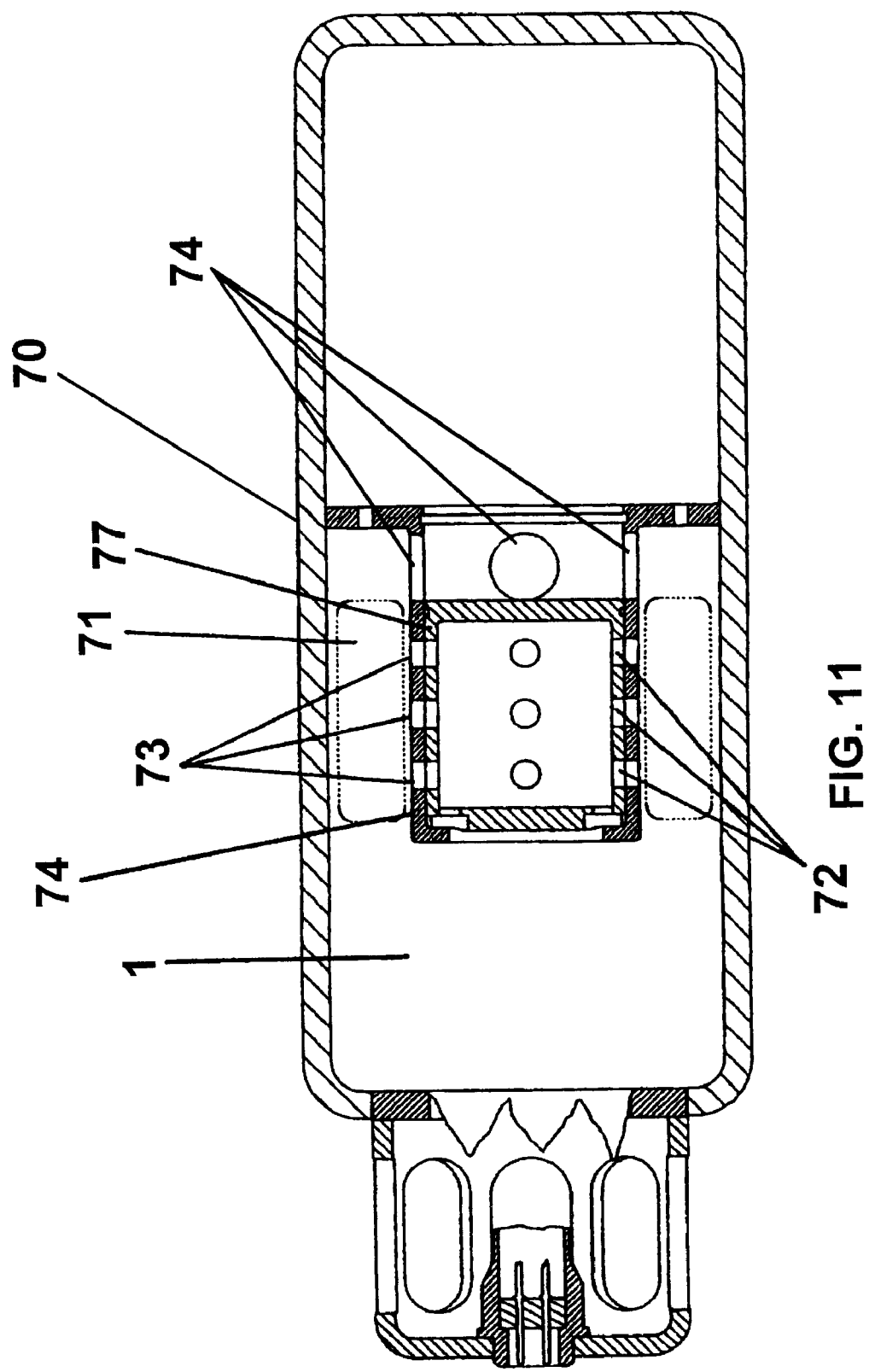
FIG. 11 is a cross-sectional view of an embodiment of the invention depicting a Co-Flow inflator which employs a heat generating material, such as, Thermite® in a post-actuation state.

FIG. 11 illustrates an embodiment of the invention comprising inflator 70 based on a Co-Flow concept in the post-actuation state. A heat producing but not necessarily gas-producing material, such as Thermite® 71, is positioned such that a portion of the gas flowing from chamber 2 into chamber 1 moves across the Thermite® 71 (an aluminum and ferric oxide material). The exothermic reaction of the Thermite® 71 is initiated by a granular material (not shown) contained in piston 77, as in previously described embodiments. The location of the Thermite® 71 is different from that of the FIG. 5 embodiment. The heat created during the reaction is transferred to the venting gas thus raising the pressure of the gas and augmenting its flow into the air bag cushion. In this embodiment of the invention piston 77 has radial ports 72 that align with radial ports 73 in cylinder 74 in the actuation stage which along with radial controlling orifices 76 permit flow of the venting gas from chamber 2 to chamber 1. The snap ring is not shown in FIG. 11 but its function is similar to previous embodiments. The initiation of the operation of the inflator is the same as with the FIGS. 1–10 embodiments, in the event the vehicle is involved in a collision or impact. The reaction of the material contained in the piston will be initiated by the impact of the percussion primers against the forward axial end of the cylinder. The stored fluid exiting the second chamber through the cylinder flow orifices and/or axial flow orifices in the bulkhead will pass over the reacting Thermite®, receive the heat therefrom, and be further pressurized. The orifice holes in the cylinder are sized to maintain a suitable pressure differential across the reacting material so as not to extinguish the reaction. The axial placement of the Thermite® 71 and the relative sizes of holes 73 and 76 are likewise selected to offer a suitable flow environment.

Figure 12:
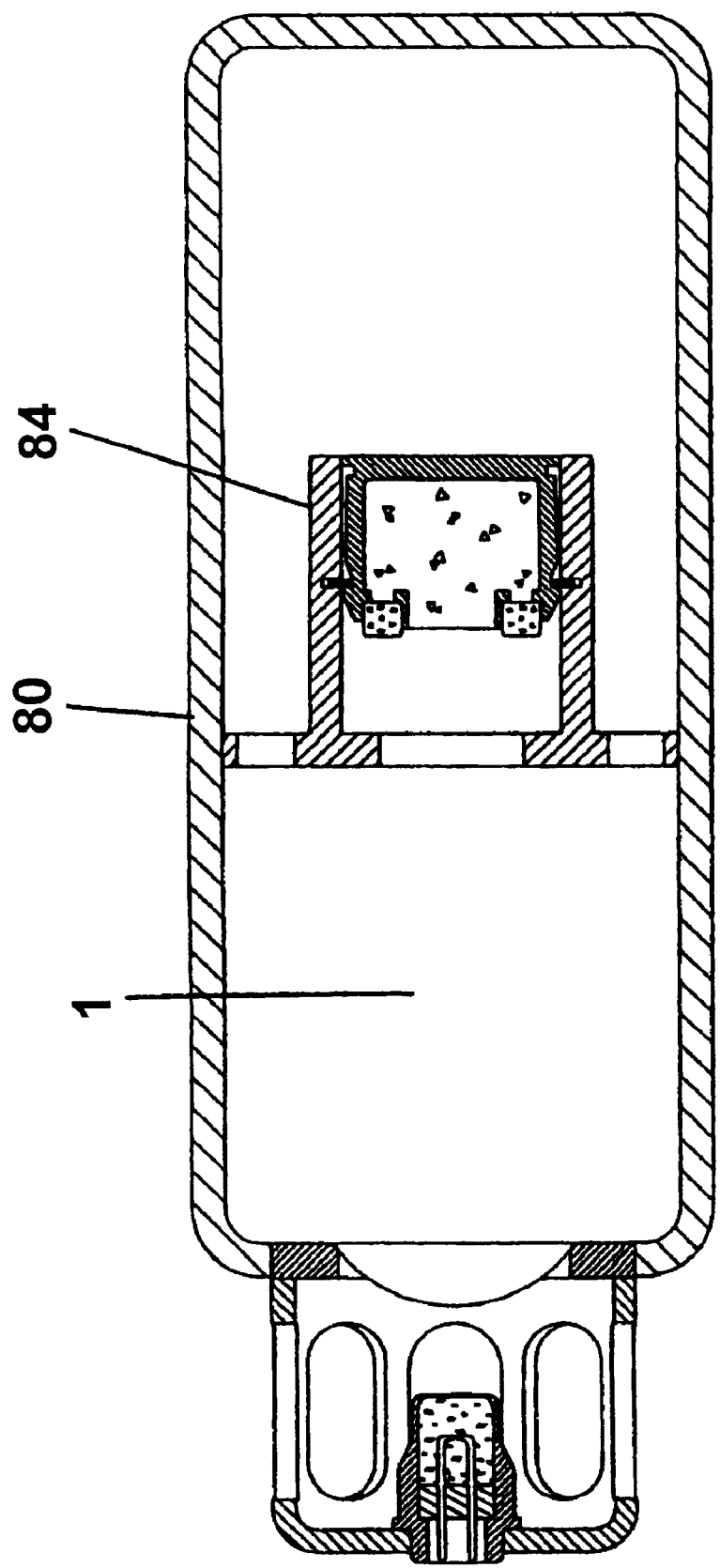
FIG. 12 is a cross-sectional view of an embodiment of the actuation device of the present invention in the pre-actuation state with axial bulkhead orifices.
Figure 13:
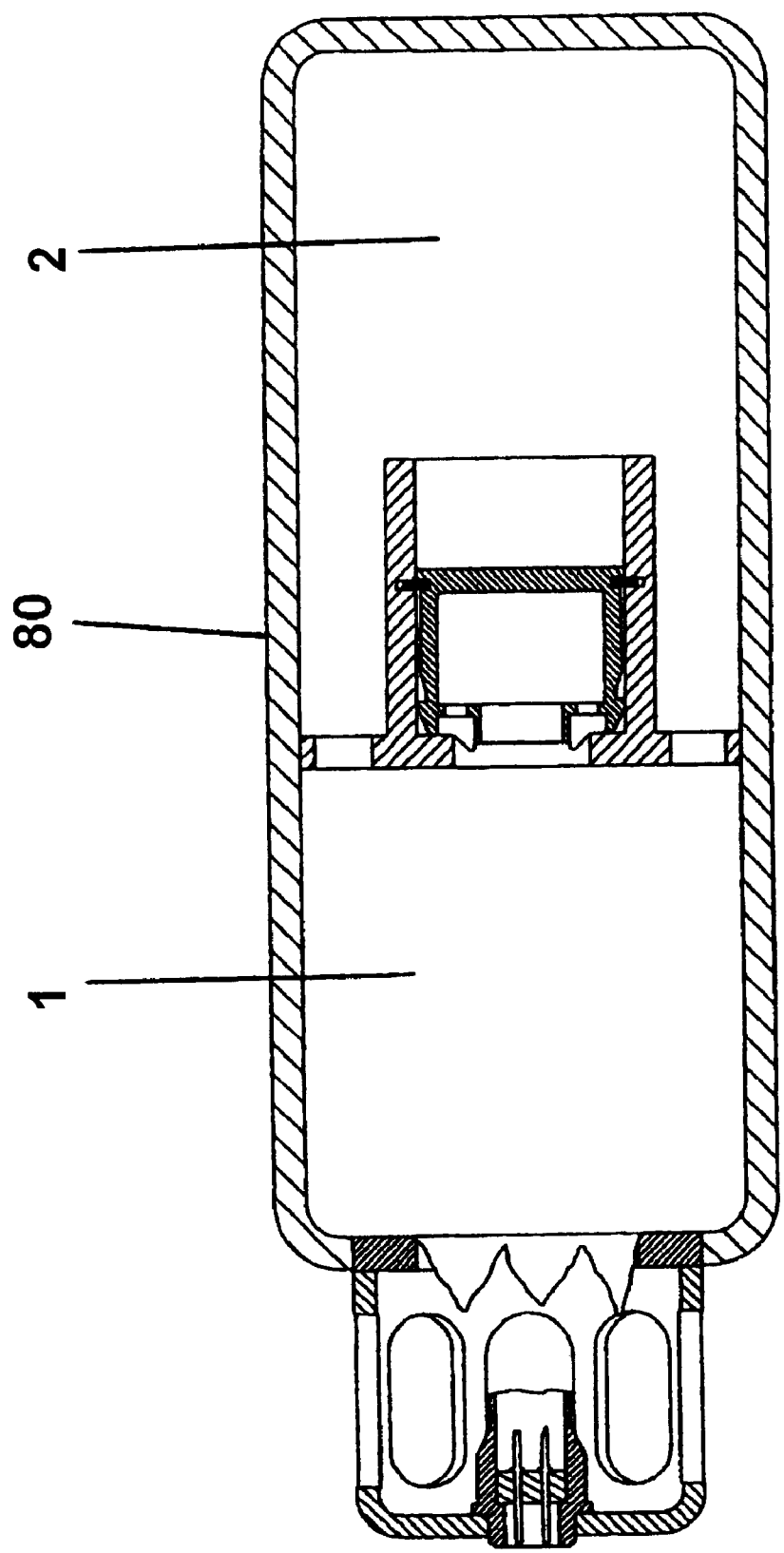
FIG. 13 is a cross-sectional view of the embodiment of FIG. 12 in the post-actuation state.
Figure 14:
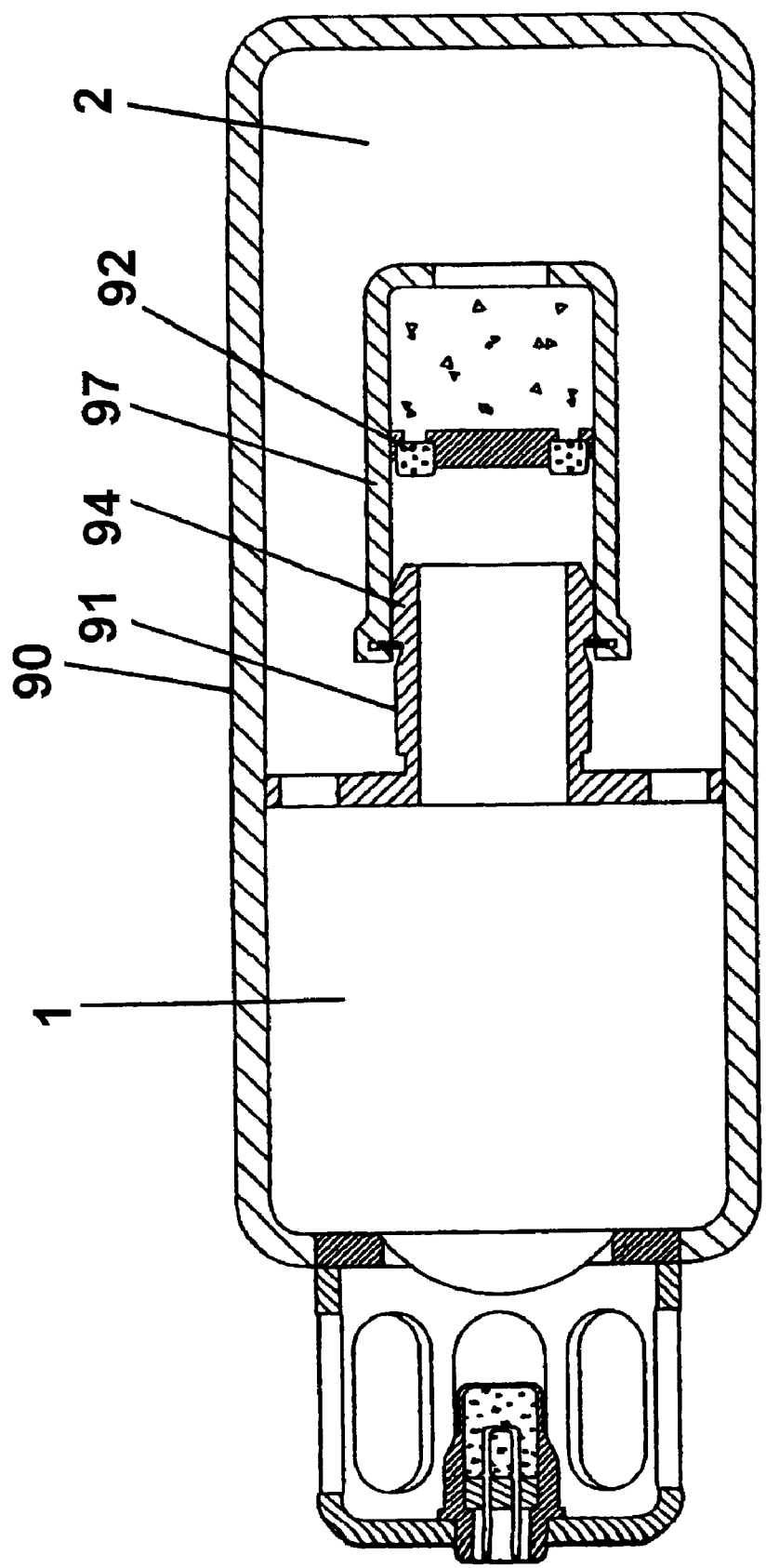
FIG. 14 is a cross-sectional view of a modified actuation device of FIG. 12 in the pre-actuation state wherein the augmenting combustion gas is exhausted into chamber 2.
Figure 15:
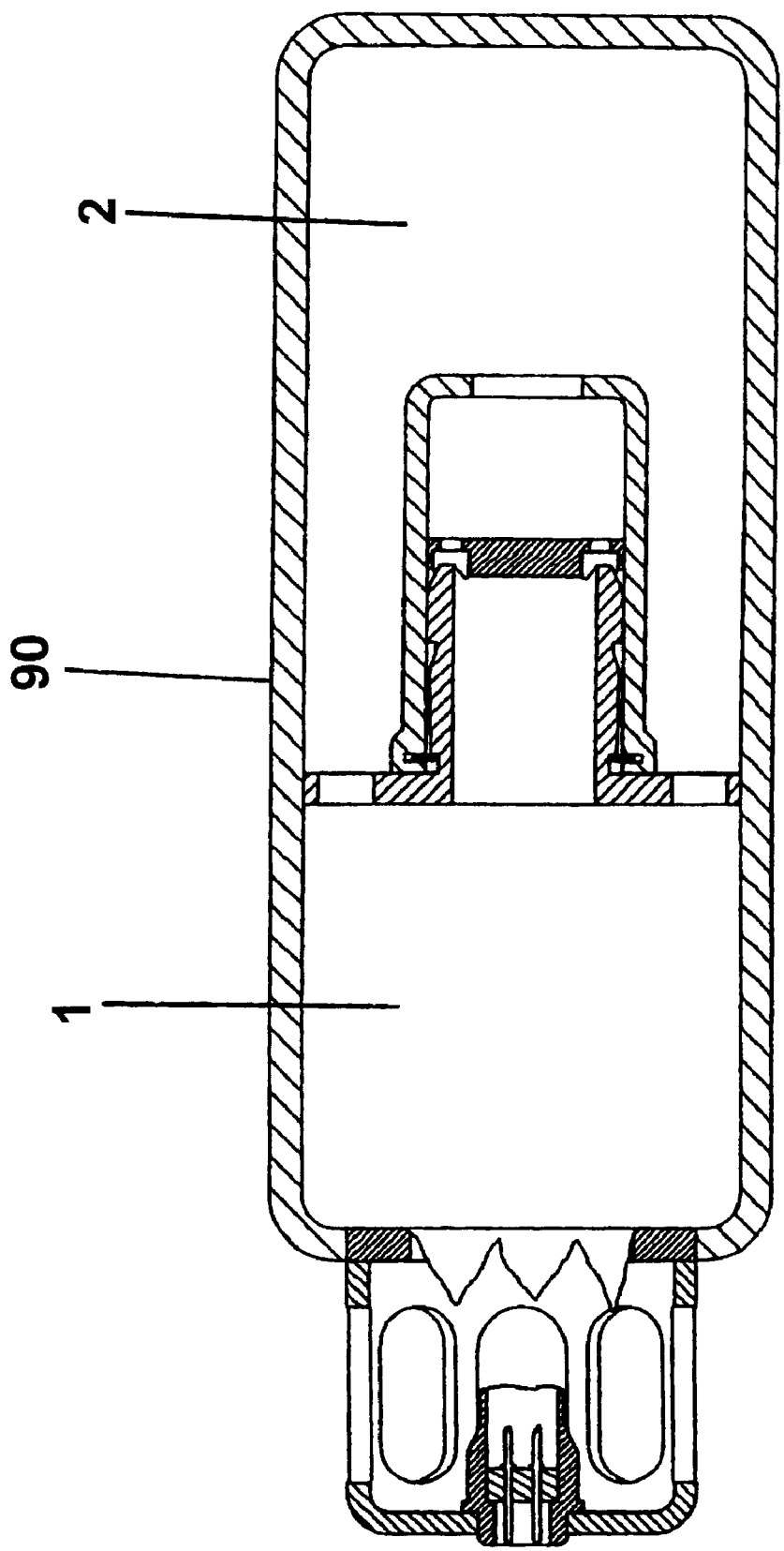
FIG. 15 is a cross-sectional view of the embodiment of FIG. 14 in the post-actuation state.

FIGS. 12 and 13 illustrate yet another embodiment of the invention comprising inflator 80 wherein there are no radial orifices formed in cylinder 84. The axial holes 82 in the partition 81 are sized to allow gas to flow from chamber 2 to chamber 1 during actuation of the inflator while at the same time allowing sufficient pressure differential to develop to move the piston. FIGS. 14 and 15 represent yet another inflator 90 wherein piston 97 envelops cylinder 94 and is slidingly engaged in a telescoping relationship with the external surface 91 of cylinder 94. While FIGS. 14 and 15 show exhausting the gaseous combustion products into chamber 2 for mixing with the venting gas, it would be understood by those in the art that an arrangement wherein the combustion products exhaust into chamber 1 is within the scope of the invention.

Figure 16:
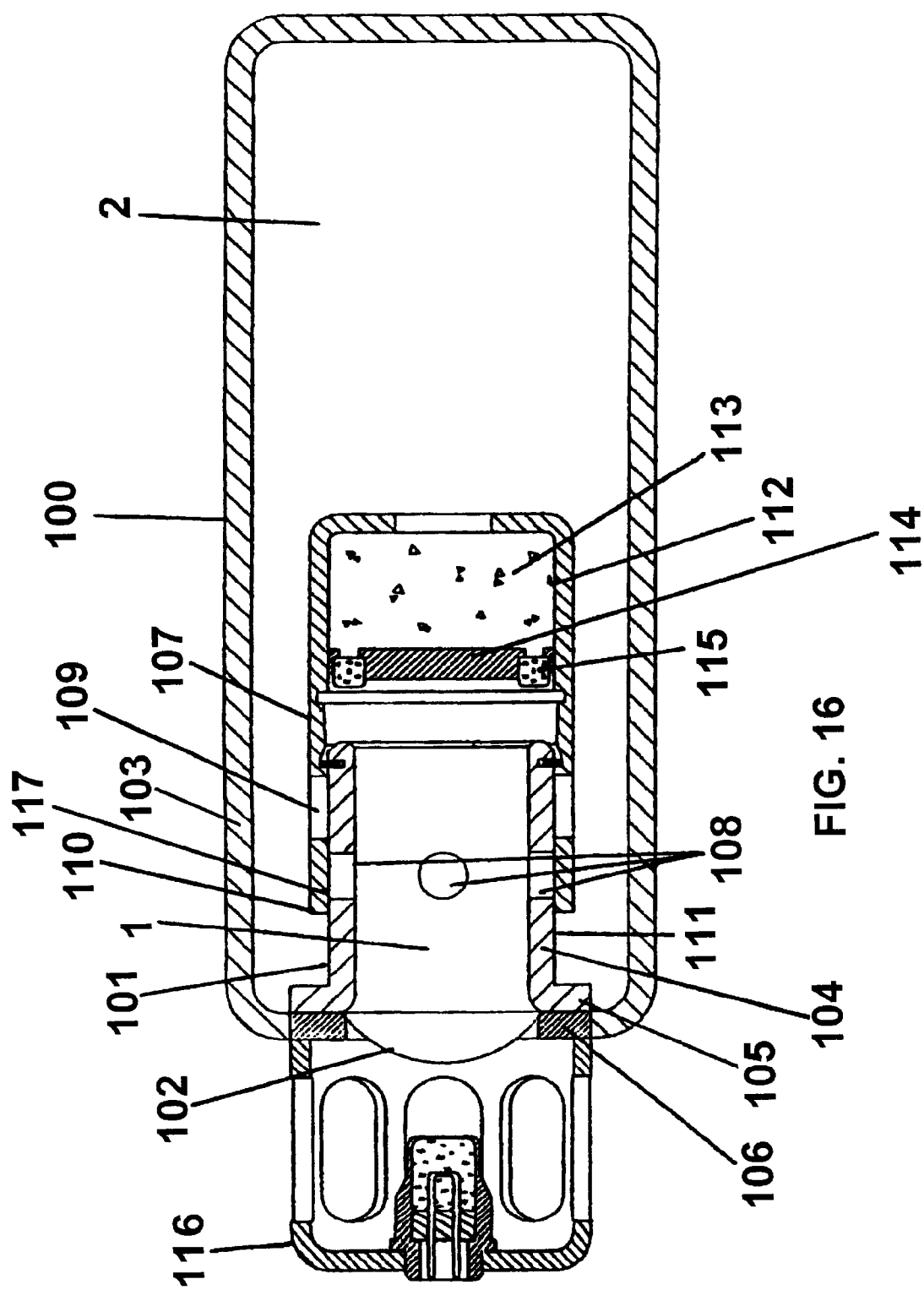
FIG. 16 is a cross-sectional view of an embodiment of the present invention in the pre-actuation state wherein the bulkhead separating the chambers of the actuation device is in the form of a cylinder.
Figure 17:
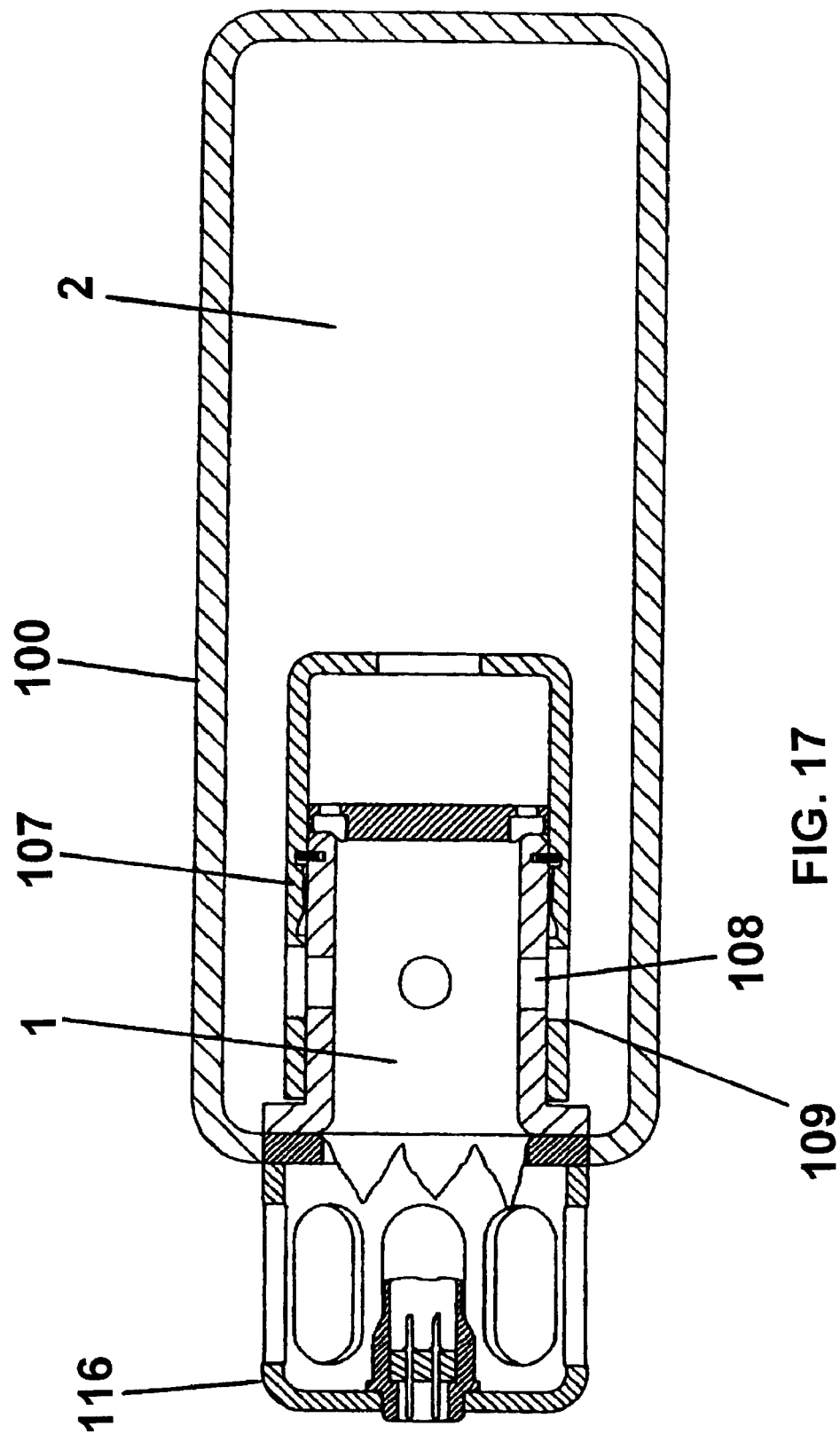
FIG. 17 is a cross-sectional view of the FIG. 16 embodiment in the post-actuation state.

FIGS. 16 and 17 illustrate a further embodiment of the invention comprising inflator 100 wherein partition 101 separates chamber 1 and chamber 2 and extends perpendicular to burst disc 102. Partition 101 is constructed in the form of a cylinder which is flanged on one end and open on the other end, the outer periphery of which defines a portion of the boundary of chamber 2. Cylinder 104 is attached at its open end to a first end of the inflator housing 103 by flange portion 105 through boss 106. Cylinder 104 can be attached to boss 106 by any conventional means, such as welding. Cylinder 104 has a plurality of controlling orifices 108 which provide fluid communication between chamber 1 and chamber 2. The device further includes cylindrical sleeve 107 which envelops cylinder 104. Cylindrical sleeve 107 includes orifices 109 which are designed to align with orifices 108 in cylinder 104. The interior surface 117 of the leading end 110 of sleeve 107 slidably engages the exterior surface 111 of cylinder 104. The trailing end of sleeve 107 contains a compartment 112 which houses a pyrotechnic charge 113 and is separated from the remainder of sleeve 107 by wall 114. Wall 114 has provided therein ignition means 115. The rupturing of disc 102 lowers the pressure in chamber 1 causing sleeve 107 to move toward manifold 116 which results in primer 115 being fired, which in turn initiates combustion of pyrotechnic 113 causing gaseous combustion products to escape into chamber 2 mixing with the pressurized venting gas contained therein thermally augmenting said gas. As shown in FIG. 17, movement of sleeve 107 towards manifold 116 causes alignment of the orifices 108 in chamber 1 and the orifices 109 in sleeve 107 thereby allowing the venting gas to exit the inflator into the air bag (not shown).

Figure 18:
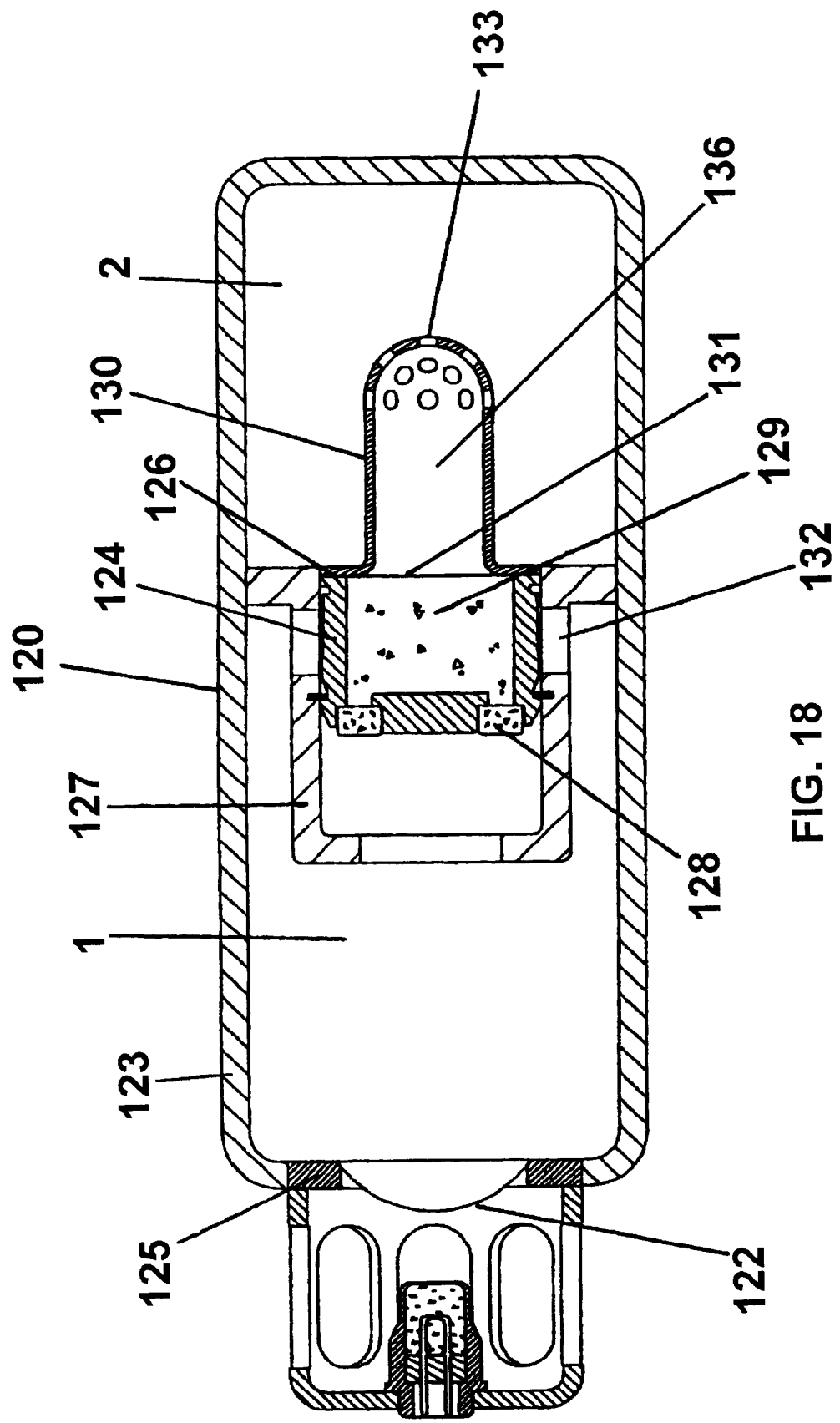
FIG. 18 is a cross-sectional view of a further embodiment of the present invention illustrating a dual-stage fluid fuel actuation device in the pre-actuation state.
Figure 19:
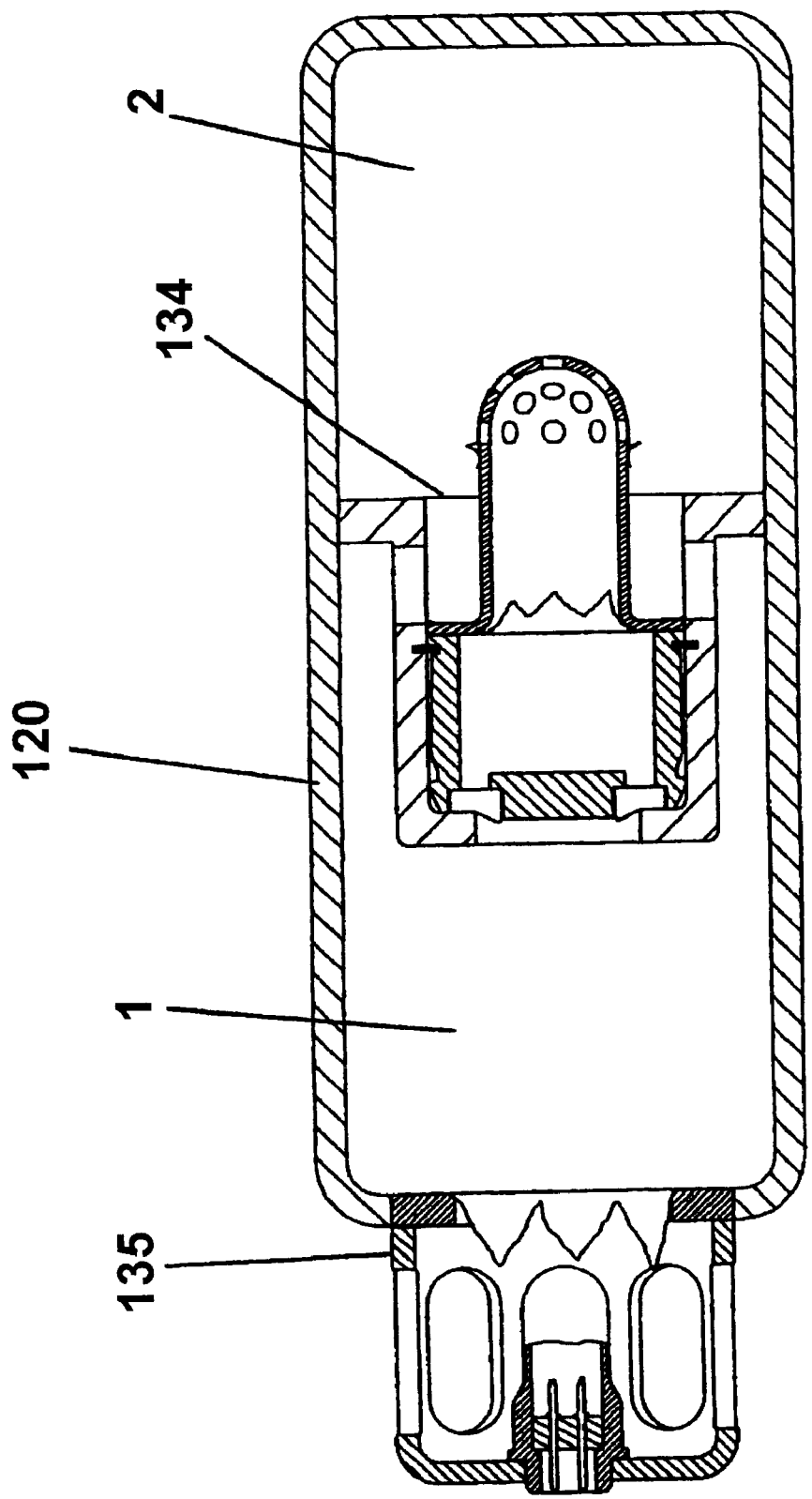
FIG. 19 is a cross-sectional view of the embodiment of FIG. 18 in the post-actuation state.

FIGS. 18 and 19 illustrate yet another inflator 120 of the invention which is directed to fluid fueled inflators. This type of inflator uses partition of the pressure vessel to hermetically seal chambers 1 and 2 from one another for the separate containment of two different types of pressurized fluids. The piston chamber contains a pyrotechnic initiator and a fuel which can be in the form of a liquid (e.g., alcohol), solid (e.g., coal dust), or gas (e.g., $H_2$). The second chamber contains an oxidant (e.g., $O_2$ or an $O_2$-rich mixture such as an oxygen/argon) that is reactive with the fuel contained in the piston. The first chamber contains a stored pressurized fluid (e.g., argon).

Upon rupture of the vessel seal, the piston will overcome the resistance provided by its retention means and will move forward due to the differential pressure created between the first and second chambers. The primers of the piston will make contact with the forward axial end of the cylinder and activate the pyrotechnic booster material to create sufficient pressure for rupturing a seal provided across the rear axial end of the piston (which is exposed to the interior of the second chamber) and thereby disperse the fuel into the oxidant-containing second chamber and initiate combustion of the fuel. The forward movement of the piston will then expose the radial orifices of the cylinder to the combustion gas formed in the second chamber (by the reaction of the piston fuel with the oxidant), thereby causing the combustion gas to enter the first chamber for producing an inflation fluid to inflate the air bag, i.e., the stored gas in the first chamber will be heated by the combustion gas. The stored gas is preferably inert which will have a quenching effect on the combustion gas.

In such devices it is desirable for the two chambers to be hermetically separated, allowing chamber 2 to contain an oxygen rich gas mixture and chamber 1 to contain a quenching gas such as argon. Fluid fueled inflators are described in U.S. Pat. No. 5,470,104 issued to Smith et al on Nov. 25, 1995, which is commonly assigned to the assignee of the present invention and is incorporated herein by reference. Fluid fueled inflators are also described in U.S. Pat. Nos. 5,494,312 and 5,496,062 which are also assigned to the assignee of the present invention and are incorporated by reference herein. In inflator 120, a fluid fuel component 130 is affixed to the trailing end 126 of piston 124. Failure of disc 122 causes piston 124 to move in the direction of chamber 1, which results in the firing of primers 128 and effects initiation of the pyrotechnic charge 129. Upon initiation of pyrotechnic 129, disc 131 bursts releasing combustion products into fluid fuel component 130 and the resulting increased pressure which allows the combustion products and fluid fuel 136 to exit via holes 133 in the fluid fuel component 130 and mix with the oxygen in chamber 2 with the subsequent formation of heated and pressurized venting gas. The venting gas exits chamber 2 through openings 134 resulting from the movement of piston 124 and through radial ports 132 in cylinder 127 into chamber 1 wherein it mixes with the quenching gas before it exits the inflator through manifold 135.

In conjunction with the use of a pyrotechnic charge in the piston for augmenting the pressurized fluid, the retention means can also include designs that will maintain the piston in its desired position as well as prevent the piston from reversing its direction in the cylinder from its post-actuation position. The tendency of the piston to reverse itself is due to the reactionary forces it encounters as the result of the ignition of the pyrotechnic charge. The retention means can take the form of an edge wound snap ring (open at both ends) positioned within a notched recess provided in the cylinder wall. The snap ring, examples of which are specifically illustrated in FIGS. 20, 21, 22(a) and 22(b) is free to expand and contract against a specifically designed contour provided to the outer axial surface of the piston. The first taper is used for accommodating the initial insertion of the piston into the cylinder until it encounters a recess in the piston for engaging the snap ring. The second taper is used to provide the necessary resistance for maintaining the piston in place during the pre-actuation position.

Figure 21:
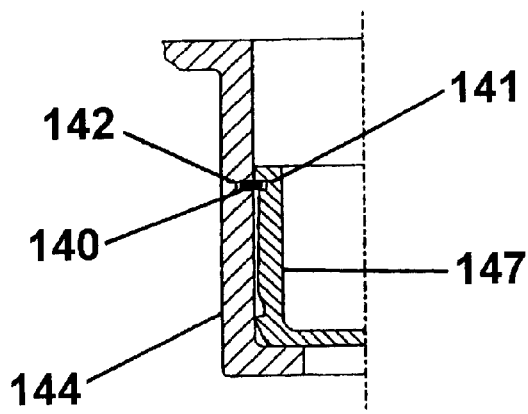
FIG. 21 is a cross-sectional view of snap ring of FIG. 20 in the post-actuation state.

Once the resistance offered by the second taper is overcome by the creation of a differential pressure between the first and second chambers, the snap ring will engage itself with the third taper of the piston valve and gradually constrict with the taper into a notched recess provided in the anterior surface of the piston (see FIG. 21). The engagement of the snap ring with the notched piston valve recess maintains the piston valve in its post-actuation position and prevents the piston from reversing itself.

Figure 20:
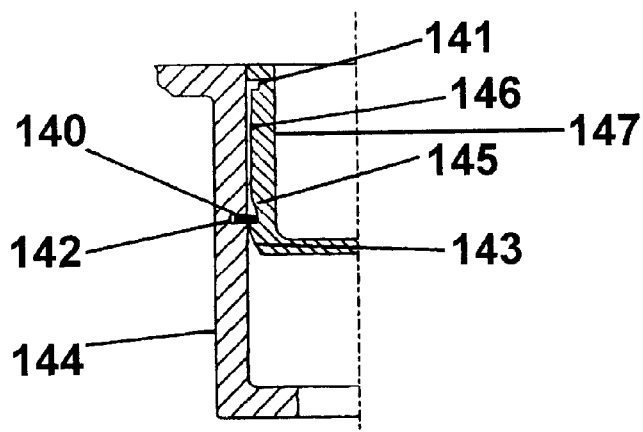
FIG. 20 is a partial cross-sectional view of the snap ring employed in the present invention in the pre-actuation state.

FIGS. 20 and 21 illustrate the snap ring 140 feature of the invention which is used for locking the sliding valve member in both the pre-actuation and actuated stages. Notched recesses 141 in piston 147 and 142 in cylinder 144 in cooperation with snap ring 140 cause the piston 147 to be locked into place during movement of the piston 147 in the direction of the arrow caused by actuation of the inflator. The piston 147 is provided with first 143, second 145 and third tapers 146. The second 145 and third tapers 146 are designed to aid the tracking and locking of piston/valve 147 from the pre-actuation to the actuated position. The first taper 143 in the case of the inflator of FIGS. 14 and 15 functions as a prominent striking surface, i.e. firing pin for the igniter 92. Snap ring 140, after actuation of the inflator, (see FIG. 21) is seated in notch 141 provided in piston 147 and can be in the form of a single or double wound ring. Snap ring 140 is typically made of carbon and stainless steel. Snap ring 140 can be obtained from Smalley Steel Ring Company. FIG. 22(a) illustrates a single ring 140 and FIG. 22(b) illustrates a double wound ring 140'.

Figure 23:
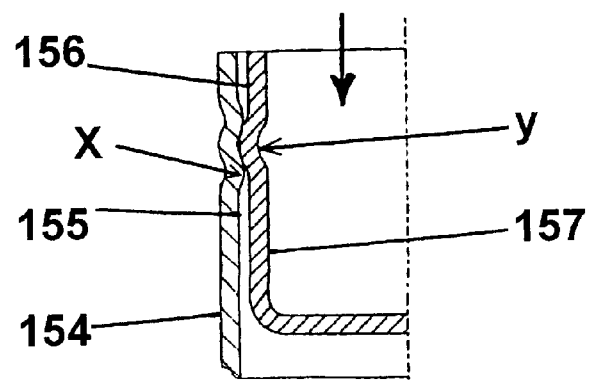
FIG. 23 is a cross-sectional view of a configuration for providing a snap fit without using a snap ring.

The retention means according to the invention disclosure herein may also take the form of a substantially mateable deformation provided in the cylinder and piston walls to offer a snap fit of the two components when engaged with each other (see FIG. 23). Once the piston is moved in the direction of the arrow, essentially overcoming the resistance offered by the cylinder/piston snap fit, the piston will be prevented from reversing itself by the lower deformation in the cylinder wall (identified by the letter "x") and the deformation in the piston wall (identified by the letter "y").

FIG. 23 illustrates this alternative embodiment depicting a snap fit between the exterior surface 156 of piston 157 and the interior surface 155 of channel member 154 in the pre-actuation stage. The arrow indicates direction of movement of the piston 157 during actuation of the inflator.

Each of the retention means illustrated in the various figures of drawings has a pre-determined resistance built into it which is overcome when the pressure differential between the first and second chambers exceeds the predetermined resistance. The terms piston and valve have been used interchangeably throughout the description of the invention.

Applications for this type of actuation system may be found wherever there is a need for the release and/or generation of a pressurized fluid in response to an external stimulus. Such applications include, but are not limited to, inflators for use in inflatable restraint systems, fire extinguishers, propulsion devices, and devices for generating thrust and mass flow. The two chambers can also be used to separate materials that react when brought into contact with each other, such as in hypergolic reactions for creating significant pressure and heat.

With this description of the invention in detail, those skilled in the art will appreciate that various modifications may be made to the invention without departing from the spirit thereof. Therefore it is not intended that the scope of the invention be limited to the specific embodiments illustrated and described. Rather, it is intended that the appended claims be construed to include alternative embodiments to the extent permitted by the prior art.

We claim:

1. An inflator for use in an inflatable restraint system comprising a pressure vessel having first and second chambers containing pressurized fluid that are separated by a common partition for containing the fluid within each of said chambers; each chamber having a substantial source of inflationary fluid for venting by the inflator;

discharge means communicating with the first chamber for the release of the fluid therein in response to a stimulus external of the vessel; and movable control means associated with said partition for regulating the passage of the fluid from the second chamber to the first chamber, said control means being activated in response to the pressure difference between said first and second chambers created by the activation of said discharge means for releasing the fluid within the first chamber said moveable control means comprising channeling means axially extending from the partition defining a path for passage of fluid between said chambers; and valve means slidingly engaged with the channeling means operably responsive to the pressure differential in said path for regulating the flow of fluid therethrough.

2. The inflator of claim 1 wherein said axially extending channeling means protrudes into said first chamber.

3. The inflator of claim 1 wherein said axially extending channeling means protrudes into said second chamber.

4. The inflator of claim 1 wherein said channeling means include orifices located in said partition.

5. The inflator of claim 1 wherein the valve means is operably responsive to a predetermined pressure differential in said path.

6. The inflator of claim 1 wherein said channeling means comprises an axially extending conduit, having an internal surface and an external surface, for slidingly receiving the valve means is constructed with means for passage of fluid into said first chamber means in response to the slidable movement of the valve means with said conduit.

7. The inflator of claim 6 wherein said valve means comprises a hollow piston and said conduit is constructed to arrest movement of said piston after fluid flow between said first and second chambers is established.

8. The inflator of claim 7 further including a piston retention means for maintaining said piston in its desired position and preventing it from reversing a direction in regard to the partition from a post-actuation position.

9. The inflator of claim 8 wherein the piston retention means comprises a snap ring.

10. The inflator of claim 8 where the piston retention means comprises mateable deformation provided in the partition and piston walls.

11. The inflator of claim 7 wherein said moveable control means further comprises augmenting means for increasing the temperature or pressure of the pressurized fluid in said first and second chambers.

12. The inflator of claim 11 wherein said augmenting means comprises a pyrotechnic charge for generating a hot combustion gas product.

13. The inflator of claim 12 wherein said augmenting means further comprises an exothermic charge.

14. The inflator of claim 12 wherein the pyrotechnic charge is positioned within said hollow piston, said piston having a leading end, said leading end of said piston being constructed to contain ignition means for igniting said pyrotechnic charge said piston having an activation position such that said pyrotechnic charge is ignited upon movement of said piston to its activation position.

15. The inflator of claim 14 wherein a combination of pyrotechnic materials are contained in said hollow piston.

16. The inflator of claim 6 wherein said valve means slidingly engages the internal surface of said axially extending conduit.

17. The inflator of claim 6 wherein said valve means slidingly engages the external surface of said axially extending conduit.

18. A fluid fueled inflator for use in an inflatable restraint system comprising a pressure vessel having first and second chambers containing pressurized fluid that are separated by a common partition for containing the fluid within each of said chambers; each chamber having a substantial source of inflationary fluid for venting by the inflator;

discharge means communicating with the first chamber for the release of the fluid therein in response to a stimulus external of the vessel;

movable control means associated with said partition for regulating the passage of the fluid from the second chamber to the first chamber, said control means being activated in response to a pressure difference between said first and second chambers created by the activation of said discharge means for releasing the fluid within the first chamber;

said moveable control means comprising cylinder means having internal and external surfaces axially extending from the partition defining a path for passage of fluid between said chambers;

valve means slidingly engaged with the cylinder means operably responsive to the pressure in said path for regulating the flow of fluid there through; and said valve means further comprising a first pyrotechnic charge component having affixed thereto a second fluid fuel component, said first and second components being separated by a seal, said second component being constructed to axially extend into said second chamber, said second component having openings which permit fluid communication with said second chamber upon actuation of the inflator.

\* \* \* \* \*